(12) United States Patent
Siddique et al.

(10) Patent No.: US 11,530,961 B2
(45) Date of Patent: *Dec. 20, 2022

(54) VEHICLE VOCATION SYSTEM

(71) Applicant: GEOTAB INC., Oakville (CA)

(72) Inventors: Javed Siddique, York (CA); Robert Bradley, Oakville (CA); Xiaochen Zhang, Toronto (CA)

(73) Assignee: GEOTAB, INC., Oakville (CA)

( * ) Notice: Subject to any disclaimer, the term of this patent is extended or adjusted under 35 U.S.C. 154(b) by 346 days.

This patent is subject to a terminal disclaimer.

(21) Appl. No.: 16/878,849

(22) Filed: May 20, 2020

(65) Prior Publication Data

US 2021/0142596 A1    May 13, 2021

Related U.S. Application Data

(60) Provisional application No. 62/931,918, filed on Nov. 7, 2019.

(51) Int. Cl.
*G01M 17/007* (2006.01)
*G07C 5/08* (2006.01)
(Continued)

(52) U.S. Cl.
CPC ........... *G01M 17/007* (2013.01); *G01S 19/42* (2013.01); *G06K 9/6267* (2013.01); *G06N 20/00* (2019.01);
(Continued)

(58) Field of Classification Search
CPC .......... G08G 1/22; G08G 1/20; G07C 5/0841; G07C 5/0816; G07C 5/08; G07C 5/02;
(Continued)

(56) References Cited

U.S. PATENT DOCUMENTS 9,142,127 B1    9/2015    McDevitt-Pimbley et al.
9,759,812 B2    9/2017    Nichols et al.
(Continued)

FOREIGN PATENT DOCUMENTS

EP    2 638 711 B1    5/2018

OTHER PUBLICATIONS

U.S. Appl. No. 16/878,746, filed May 20, 2020, Siddique et al.
(Continued)

*Primary Examiner* — Yazan A Soofi
(74) *Attorney, Agent, or Firm* — Hartman Global IP Law; Gary M. Hartman; Domenica N. S. Hartman

(57) ABSTRACT

System for automatically classifying vehicle vocation and benchmarking vehicle performance relative to other vehicles having the same vocation classification, independent of vehicle fleet groupings, industry vehicle application groupings and vehicle type groupings, is disclosed. The system includes a vehicle vocation classifier in communication with a data management system to store historical vehicle data including recurring vehicle usage data, and assign one or more predicted vocations for each vehicle based on the recurring vehicle usage data using a machine learning technique. The system also includes a benchmarking management system for grouping the historical vehicle data for vehicles of same determined predicted vocation, determining therefrom benchmarking vehicles having better performance characteristics than other vehicles of the same determined predicted vocation, and benchmarking performance of the other predicted vocation vehicles relative to the benchmarking vehicles.

11 Claims, 14 Drawing Sheets

(51) Int. Cl.
- *G06N 20/00* (2019.01)
- *G01S 19/42* (2010.01)
- *G08G 1/00* (2006.01)
- *H04W 4/029* (2018.01)
- *G06K 9/62* (2022.01)
- *G07C 5/00* (2006.01)
- *G07C 5/02* (2006.01)

(52) U.S. Cl.
CPC ............... *G07C 5/008* (2013.01); *G07C 5/02* (2013.01); *G07C 5/08* (2013.01); *G07C 5/0816* (2013.01); *G07C 5/0841* (2013.01); *G08G 1/20* (2013.01); *G08G 1/22* (2013.01); *H04W 4/029* (2018.02)

(58) Field of Classification Search
CPC ...... G07C 5/008; G06K 9/6267; G01S 19/42; G01C 21/3407; G06N 20/00; H04W 4/029; G01M 17/007
USPC .......................................................... 701/29
See application file for complete search history.

(56) References Cited

U.S. PATENT DOCUMENTS

| | | | |
|---|---|---|---|
| 9,769,616 B1 | 9/2017 | Pao et al. | |
| 10,037,693 B2 | 7/2018 | Ryu et al. | |
| 10,352,709 B1 | 7/2019 | Kalenkovich et al. | |
| 10,699,564 B1 | 6/2020 | Lewis et al. | |
| 10,928,277 B1* | 2/2021 | Siddique | G07C 5/0816 |
| 2004/0249568 A1 | 12/2004 | Endo et al. | |
| 2006/0229799 A1* | 10/2006 | Nimmo | G08G 1/20 701/117 |
| 2006/0235707 A1* | 10/2006 | Goldstein | G05B 23/0283 702/182 |
| 2010/0033338 A1 | 2/2010 | Sverrisson | |
| 2010/0161217 A1 | 6/2010 | Yamamoto | |
| 2014/0188533 A1* | 7/2014 | Davidson | G06Q 10/0631 705/7.12 |
| 2016/0364739 A1 | 12/2016 | Dann et al. | |
| 2017/0089717 A1 | 3/2017 | White et al. | |
| 2017/0163515 A1 | 6/2017 | Heliker et al. | |
| 2017/0221069 A1* | 8/2017 | Remboski | G07C 5/0825 |
| 2017/0276499 A1 | 9/2017 | Sun et al. | |
| 2017/0277717 A1 | 9/2017 | Asaad et al. | |
| 2018/0074502 A1 | 3/2018 | Holben | |
| 2018/0095977 A1 | 4/2018 | Reddy et al. | |
| 2018/0137759 A1 | 5/2018 | Oh et al. | |
| 2018/0157257 A1 | 6/2018 | Hashimoto et al. | |
| 2018/0182248 A1 | 6/2018 | Kanai et al. | |
| 2018/0197354 A1* | 7/2018 | Remboski | G07C 5/0816 |
| 2018/0197355 A1* | 7/2018 | Remboski | G07C 5/0808 |
| 2018/0342113 A1* | 11/2018 | Kislovskiy | G07C 5/008 |
| 2019/0087529 A1* | 3/2019 | Steingrimsson | G06F 16/2465 |
| 2019/0102840 A1* | 4/2019 | Perl | G07C 5/02 |
| 2019/0121350 A1* | 4/2019 | Cella | H04L 1/0002 |
| 2019/0130664 A1* | 5/2019 | Appel | G06N 20/00 |
| 2019/0143967 A1 | 5/2019 | Kutila et al. | |
| 2019/0171187 A1* | 6/2019 | Cella | G06N 3/086 |
| 2019/0236695 A1* | 8/2019 | McKenna | G06N 7/005 |
| 2019/0263417 A1* | 8/2019 | Rau | B60W 40/12 |
| 2019/0272747 A1 | 9/2019 | Raamot | |
| 2019/0287388 A1* | 9/2019 | Salti | G07C 5/008 |
| 2019/0287403 A1 | 9/2019 | Aoude et al. | |
| 2019/0311289 A1* | 10/2019 | Nguyen | G06Q 40/08 |
| 2019/0311617 A1 | 10/2019 | Karaoguz | |
| 2019/0318620 A1 | 10/2019 | Yang et al. | |
| 2019/0333377 A1 | 10/2019 | Malkes et al. | |
| 2021/0089039 A1* | 3/2021 | Schultz | G05D 1/0221 |

OTHER PUBLICATIONS

U.S. Appl. No. 16/878,803, filed May 20, 2020, Siddique et al.
U.S. Appl. No. 16/894,673, filed Jun. 5, 2020, Siddique et al.
U.S. Appl. No. 16/448,657, filed Jun. 21, 2019, Lewis et al.
U.S. Appl. No. 16/448,694, filed Jun. 21, 2019, Lewis et al.
U.S. Appl. No. 16/535,527, filed Aug. 8, 2019, Lewis et al.
U.S. Appl. No. 16/870,859, filed May 8, 2020, Lewis et al.
U.S. Appl. No. 16/877,936, filed May 19, 2020, Lewis et al.
U.S. Appl. No. 16/877,963, filed May 19, 2020, Lewis et al.
U.S. Appl. No. 16/877,982, filed May 19, 2020, Lewis et al.
Prytz, Machine learning methods for vehicle predictive maintenance using off-board and on-board data. Licentiate Thesis, Halmstad University Dissertations No. 9. 2014, 96 pages.

\* cited by examiner

VEHICLE VOCATION SYSTEM

This patent application is a non-provisional of and claims priority to and the benefit of U.S. Provisional Patent Application No. 62/931,918, filed on Nov. 7, 2019, entitled "INTELLIGENT TELEMATICS SYSTEM FOR PROVIDING VEHICLE VOCATION", which is incorporated by reference in its entirety.

TECHNICAL FIELD

The present disclosure generally relates to a telematics vehicle vocation classifier and benchmarking system for automatically classifying vehicle vocation and benchmarking vehicle performance attributes. The present disclosure also relates to training a classifier to recognize vehicle vocation.

BACKGROUND

Telematics systems have been employed by fleet owners to monitor use and performance of vehicles in the fleet. While this has resulted in improved performance and maintenance of vehicles in the fleet, fleet owners are not able to distinguish between different driving usage patterns for like vehicles and un-like vehicles in their fleet.

SUMMARY

The present disclosure is directed to aspects in a vehicular telemetry environment. A new capability to automatically classify vehicles by vocation that is independent of vehicle fleet groupings, industry vehicle application groupings and vehicle type groupings may be provided. Benchmarking vehicles having same vocation relative to each other may also be provided.

In accordance with a first broad aspect there is provided a method of training a classifier to recognize vehicle vocation. The method comprises: selecting from historical vehicle data for each vehicle of a plurality of vehicles a series of vehicle usage values over time that correspond to vehicle usage executions, the series of vehicle usage values comprising one of a series of singular usage values and a series of multiple associated usage values which are independent of vehicle fleet groupings, industry vehicle application groupings and vehicle type groupings; organizing the series of vehicle usage values relative to each other to generate at least one vehicle operating usage pattern for each vehicle; determining if the generated at least one vehicle operating usage pattern is representative of a corresponding predominant vehicle behavioral execution pattern; extracting data of vehicles having the determined corresponding predominant vehicle behavioral execution pattern and assigning a label to the extracted data corresponding to the determined predominant vehicle behavioral execution pattern; generating training data from the label and the extracted data, and, using at least one machine learning technique with the training data to define a classifier for classifying at least one vehicle vocation parameter for the vehicle independent of vehicle fleet groupings, industry vehicle application groupings and vehicle type groupings.

In an embodiment the organizing of the series of vehicle usage values generates single dimension vehicle operating usage patterns. In another embodiment the organizing of the series of usage values generates multi dimension vehicle operating usage patterns.

In an embodiment the label assigned to extracted data is an intermediate vocation label and the vehicle vocation parameter is a vocation feature for the vehicle. In another embodiment, the label assigned to extracted data is a vocation label and the vehicle vocation parameter is a vehicle vocation classification for the vehicle.

In an embodiment, the series of vehicle usage values relate to features of Geolocation, Two Distance, Routine, Geo Neighbourhood, Stop Duration and Customer Location, and Idling Duration and Driving Duration.

In an embodiment, the series of multiple associated usage values comprises a series of 2 associated usage values over time that correspond to vehicle usage executions, and the step of organizing comprises organizing the series of 2 associated usage values relative to each other to generate one or more 2-dimensional vehicle operating usage patterns and wherein the two dimensional vehicle operating usage patterns may be represented as images.

In an embodiment the series of 2 associated usage values relating to the Geolocation feature are vehicle stop location and start location and wherein the feature is organized with a matrix. In another embodiment the series of 2 associated usage values relating to the Two Distance feature are vehicle trip distance and point to point distance and wherein the feature is organized with a matrix. In another embodiment the series of 2 associated usage values relating to the Routine feature are vehicle hour of day and day of week trip start time and wherein the feature is organized with a matrix. In another embodiment the series of 2 associated usage values relating to the Geo Neighbourhood feature are vehicle stop location and start location and wherein the feature is organized with a matrix where a central location of the trip is placed in the middle of the matrix. In another embodiment the series of 2 associated usage values relating to the Idling Duration and Driving Duration feature are vehicle the idling duration and the driving duration and wherein the feature is organized with a matrix.

In an embodiment the series of Stop Duration values relating to the Stop Duration and Customer Location feature are vehicle stop location and stop duration and wherein the feature is organized with the stop locations ranked based on average stop duration and placed in an array.

In an embodiment the historical vehicle data for each vehicle of a plurality of vehicles comprises GPS data, trip data, and some vehicle labelling wherein the GPS data may comprise Latitude and Longitude locations where the vehicle has visited and the trip data may comprise a timestamp when the trip begins, when the trip ends, and information on the distance travelled during the trip, the amount of idling during the trip and the driving duration.

According to a second broad aspect there is provided a method of automatically classifying vehicles by vocation that is independent of vehicle fleet groupings, industry vehicle application groupings and vehicle type groupings, and benchmarking vehicles having same vocation relative to each other. The method comprises: storing historical vehicle data for each vehicle of a plurality of vehicles, the historical vehicle data comprising recurring vehicle usage data; assigning to each vehicle of the plurality of vehicles, using one or more machine learning trained classifiers, one or more predicted vocations based on the recurring vehicle usage data for each vehicle; grouping, by at least each of the one or more predicted vocations, the historical vehicle data for vehicles of same determined one or more predicted vocations, and determining therefrom one or more benchmarking vehicles having better performance characteristics than other vehicles of the same determined one or more predicted vocations; and, benchmarking performance of the other vehicles relative to the one or more benchmarking vehicles.

In an embodiment the assigning first assigns one or more intermediate predicted vocation features based on the recurring vehicle usage data for the each vehicle and wherein the assigning second assigns one or more vocations for each the vehicle based at least on the one or more intermediate predicted vocation features.

In an embodiment the assigning to each vehicle of the plurality of vehicles one or more vocation classes comprises: analysing the recurring vehicle usage data for the each vehicle to determine therefrom one or more predominant vehicle behavioral executions for the each vehicle; and assigning probability scores to each of the one or more predominant vehicle behavioral executions representing the one or more predicted vocations for the each vehicle. In another embodiment the assigning probability scores first assigns to each of the one or more predominant vehicle behavioral executions intermediate probability scores representing one or more corresponding intermediate predicted vocation features for the each vehicle. In another embodiment the method further comprises scoring at least the intermediate predicted vocation features, with at least one or more additional machine learning trained classifiers, to determine the one or more predicted vocations for the each vehicle.

In an embodiment the method further comprising communicating vehicle operation information of one of the benchmarked vehicles, other vehicles and both to a fleet owner.

In another embodiment the one or more predicted vocations for the each vehicle is based on one or more features of geolocation, two distance, routine, geo-neighborhood, stop duration and customer location, and idling duration and driving duration.

In an embodiment the one or more intermediate predicted vocation features for the each vehicle is based on one or more features of geolocation, two distance, routine, geo-neighborhood, stop duration and customer location, and idling duration and driving duration.

In an embodiment, the step of storing the raw vehicle data is collected on each vehicle from telematics monitoring devices and is thereafter transmitted to a data management system for storage.

In a third broad aspect there is provided a telematics vehicle vocation classifier and benchmarking system for automatically classifying vehicle vocation and benchmarking vehicle performance attributes of a plurality of vehicles having a same vocation classification independent of vehicle fleet groupings, industry vehicle application groupings and vehicle type groupings. The system comprises: at least one vehicle vocation classifier communicating with a data management system that is configured to store historical vehicle data for each vehicle of the plurality of vehicles, the historical vehicle data including recurring vehicle usage data; the at least one vehicle vocation classifier configured by a machine learning technique and responsive to the recurring vehicle usage data for the each vehicle for assigning one or more predicted vocations for the each vehicle based on the recurring vehicle usage data; and, a benchmarking management system communicating with the data management system and the at least one classifier configured to: group at least by vocation the historical vehicle data for vehicles of same determined predicted vocation and determine therefrom one or more benchmarking vehicles having better performance characteristics than other vehicles of the same determined predicted vocation; and, benchmark performance of the other predicted vocation vehicles relative to the one or more benchmarking vehicles.

In an embodiment of the telematics vehicle vocation classifier and benchmarking system the at least one vehicle vocation classifier comprises multiple vehicle vocation classifiers arranged in one of a series relation, a parallel relation and a combination of both, and configured for assigning the one or more predicted vocations, one or more intermediate predicted vocation features, and both.

In an embodiment of the telematics vehicle vocation classifier and benchmarking system the at least one vehicle vocation classifier first assigns one or more intermediate predicted vocation features based on the recurring vehicle usage data for the each vehicle and wherein at least another one of the vehicle vocation classifiers assigns one or more vocations for the each vehicle based at least on the one or more intermediate predicted vocation features. In another embodiment the one or more intermediate vocation classifier provides one or more intermediate predicted vocations for the vehicle based on one or more features of geolocation, two distance, routine, geo-neighborhood, stop duration and customer location, and idling duration and driving duration.

In an embodiment of the telematics vehicle vocation classifier and benchmarking system the benchmarking management system is configured to communicate vehicle operation information of one of the benchmarked vehicles, other refined predicted vocation vehicles and both with a fleet owner.

In an embodiment of the telematics vehicle vocation classifier and benchmarking system one or more vehicle classifiers comprises one or more intermediate classifiers with at least one intermediate classifier configured by a machine learning technique for receiving the recurring vehicle usage data for the each vehicle to determine therefrom one or more predominant vehicle behavioral executions for the each vehicle, and to assign to each of the one or more predominant vehicle behavioral executions intermediate probability scores representing one or more intermediate predicted vocation features for the each vehicle. In another embodiment the telematics vehicle vocation classifier and benchmarking system further comprises at least one refined additional prediction classifier in communication with the at least one intermediate vehicle vocation classifier for receiving the intermediate probability scores representing intermediate predicted vocation features, and the at least one refined additional prediction classifier further scoring the intermediate vocation features to automatically determine the one or more predicted vocations for the each vehicle.

In an embodiment the telematics vehicle vocation classifier and benchmarking system further comprises a plurality of intermediate vehicle vocation classifiers each configured by a machine learning algorithm responsive to differing recurring vehicle feature usage data for the vehicle.

In an embodiment of the telematics vehicle vocation classifier and benchmarking system the benchmarking management system comprises a plurality of vocation benchmarking management systems, one for each vocation predicted by the refined prediction classifier.

In an embodiment of the telematics vehicle vocation classifier and benchmarking system the data management system forms part of the telematics vehicle vocation classifier and benchmarking system.

In an embodiment the telematics vehicle vocation classifier and benchmarking further comprising telematics monitoring devices for transmitting the raw vehicle data to the data management system.

BRIEF DESCRIPTION OF THE DRAWINGS

Exemplary non-limiting embodiments are described with reference to the accompanying drawings in which.

Figure 1:
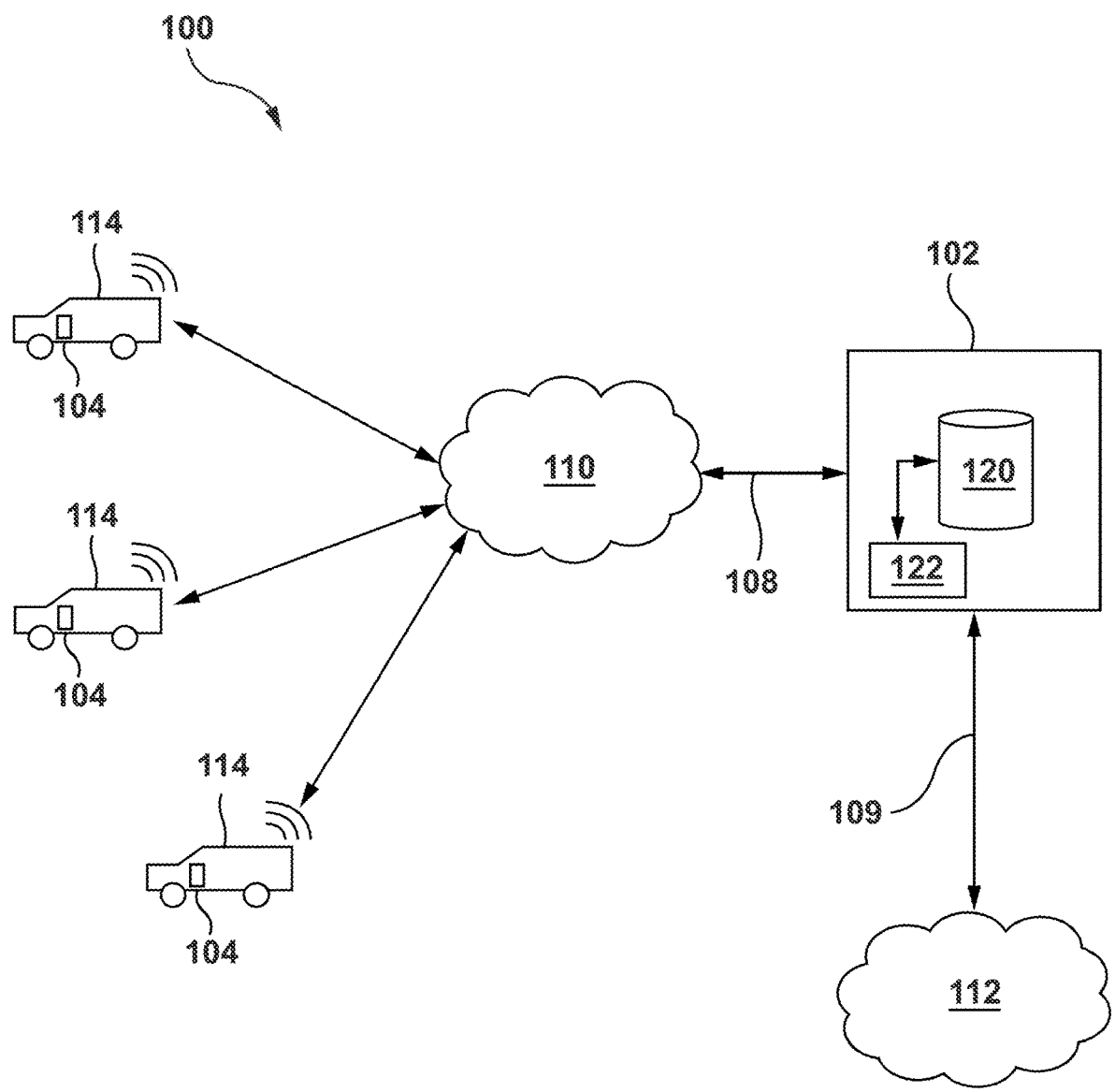
FIG. 1 is a diagrammatic view of a simplified block diagram of an exemplary telematics system.

The drawings are not necessarily to scale and are diagrammatic representations of the exemplary non-limiting embodiments of the present invention.

DETAILED DESCRIPTION

Discussion of the Problem and Technical Effects of Solution

Telematics systems have been employed by fleet owners to monitor use and performance of vehicles in the fleet. This has resulted in improved performance and maintenance of vehicles in the fleet. However fleet owners are not able to distinguish between different driving patterns for like vehicles and un-like vehicles in their fleet.

The inventors recognized and realized that if driving patterns for vehicles in the ecosystem of all vehicles of all fleets monitored by the applicant could be grouped into similar driving vehicle behavioural executions then it may be possible to benchmark vehicles relative to each other based upon vehicle behavioural executions that are agnostic vis-à-vis industry, vehicle type, and fleet ownership. The inventors recognized and realized that classification of vehicle behavioural executions into different vocations would involve aggregating raw telematic vehicle data and curating this data into training data to train machine learning classifiers to predict vehicle vocation. Once vehicles sharing the same vehicle behavioral executions and vocation are able to be predicted, then these vehicles of the same vocation may be benchmarked relative to the better performing vehicles of the same vocation, regardless of the vehicles operating in different industries, different vehicle fleets and different types of vehicles. The benchmarking information may then be shared with fleet owners in the entire ecosystem to improve vehicle performance in the ecosystem.

For example, the inventors recognized and realized that vehicle behavioural executions for drivers working in the auto parts supply industry may be classified to be in the same vocation as the pizza delivery industry. Clearly these are two separate and distinct industries which are operated by two different fleet owners and may include vehicles of different types such as, for example, the auto parts supply industry having pickup trucks or vans, and the pizza delivery industry having small to medium size automobiles. However, the inventors recognized and realized that vehicles in each of these different industries may exhibit the same or similar vehicle behavioural executions. The inventors recognized and appreciated that if certain driving patterns resulting in improved performance, such as for example, idling, is found in one or more vehicles exhibiting the same or similar behavioural executions, then this information forms the basis of making recommendations not only to the fleet owner of the vehicle(s) exhibiting improved performance but also to fleet owners of in different industries exhibiting the same vehicle behavioural execution. Communication of this information allows fleet managers to either implement or adjust rules of vehicle operation to enhance performance or investigate the vehicle operation to determine why the performance is not optimal.

The inventors recognized and appreciated that while it may not be advantageous to compare vehicles between industries, a comparison of vehicles with the same vehicle behavioural executions across different industries may be advantageous. This permits benchmarking of vehicles against each other by benchmarking vehicles of like driving patterns as opposed to similar vehicles, vehicles within the same industry, or vehicles within the same fleet. Thus, each fleet owner may adopt different standards or rules to enhance operation for vehicles in their fleet displaying different driving category patterns. It also allows for these different subsets of vehicles to be benchmarked with vehicles in another fleet of the same category.

The ecosystem for vehicle performance is improved for all vehicles having the same vehicle behavioral executions. This is because while it may be possible for a fleet owner who has, for example, 25,000 vehicles to determine targets that might allow for benchmark optimization, it is much less likely for a fleet owner that has 5 or 50 vehicles to perform benchmarking. Hence there is advantage in the ecosystem to transfer benchmarked data to smaller fleets. Moreover, by not limiting the data collection to just the larger fleets but to all vehicles in all fleets, the ecosystem of all vehicles is served.

To determine vehicle usage patterns from recurring vehicle behaviour executions, the inventors recognized and appreciated that one or more prediction classifiers may be configured by machine learning techniques for recognizing vehicles having like vehicle usage patterns from recurring behavioural executions and predicting vocations of these vehicles. The data used to train the models may be taken from data collected by a telematics system.

A telematics system monitors a vehicle using an onboard monitoring device for gathering and transmitting vehicle operation information. For instance, fleet managers employ telematics to have remote access to real time operation information of each vehicle in a fleet. A vehicle may include a car, truck, recreational vehicle, heavy equipment, tractor, snowmobile or other transportation asset. A monitoring device may detect environmental operating conditions associated with a vehicle, for example, outside temperature, attachment status of an attached trailer, and temperature inside an attached refrigeration trailer. A monitoring device may also detect operating conditions of an associated vehicle, such as position, (e.g., geographic coordinates), speed, and acceleration, time of day of operation, distance traveled, stop duration, customer location, idling duration, driving duration, among others. Hence, the monitoring device collects and transmits data to the telematics system that is representative of the vehicle operation and usage execution during times the vehicle is in use. This data may be collected over a time period of sufficient duration to permit to allow for pattern recognition of the vehicles operation. In an example the duration may be determined to be a number of days between 30 days and 90 days.

In an exemplary telematics system, raw vehicle data, including vehicle operation information indicative of a vehicle's operating conditions, is transmitted from an onboard monitoring device to a remote subsystem, (e.g., data management system which may comprise a cloud system or a management system). Raw vehicle data may include information indicating the identity of the onboard monitoring device (e.g., device identifier, device ID) and/or the identity of the associated vehicle the onboard monitoring device is aboard. Specific and non-limiting examples of raw vehicle data includes device ID data, position data, speed data, ignition state data, (e.g. indicates whether vehicle ignition is ON or OFF), and datetime data indicative of a date and time vehicle operating conditions were logged by the monitoring device. Raw vehicle data transmitted and collected over a period of time forms historical vehicle data which may be stored by the remote subsystem for future analysis of a single vehicle or fleet performance. In practise, a single fleet may comprise many vehicles, and thus large volumes of raw vehicle data (e.g., terabytes, petabytes, exabytes . . . ) may be transmitted to, and stored by, a remote subsystem.

Illustrated in FIG. 1 is a simplified block diagram of an exemplary telematics system for gathering and storing vehicle operation information. Telematics system 100 comprises telematics subsystem 102 having a first network interface 108 and onboard monitoring devices 104 of vehicles 114 communicatively coupled therewith via communication network 110.

The telematics subsystem 102 in an embodiment comprises a management system which is a managed cloud data warehouse for performing analytics on data stored therein. In another embodiment, the management system may comprise a plurality of management systems, datastores, and other devices, configured in a centralized, distributed or other arrangement. In embodiments, one or more different management systems may be employed and configured separately or in a centralized, distributed or other arrangement.

Communication network 110 may include one or more computing systems and may be any suitable combination of networks or portions thereof to facilitate communication between network components. Some examples of networks include, Wide Area Networks (WANs), Local Area Networks (LANs), Wireless Wide Area Networks (WWANs), data networks, cellular networks, voice networks, among other networks, which may be wired and/or wireless. Communication network 110 may operate according to one or more communication protocols, such as, General Packet Radio Service (GPRS), Universal Mobile Telecommunications Service (UMTS), GSM, Enhanced Data Rates for GSM Evolution (EDGE), LTE, CDMA, LPWAN, Wi-Fi, Bluetooth, Ethernet, HTTP/S, TCP, and CoAP/DTLS, or other suitable protocol. Communication network 110 may take other forms as well.

Telematics system 100 may comprise another network interface 109 for communicatively coupling to another communication network 112. In an embodiment communication network 112 may comprise a communication gateway between the fleet owners and the telematics system 100.

Also shown in FIG. 1 are vehicles 114, each thereof having aboard the onboard monitoring devices 104. A vehicle may include a car, truck, recreational vehicle, heavy equipment, tractor, snowmobile, or other transportation asset. Onboard monitoring devices 104 may transmit raw vehicle data associated with vehicles 114 through the communication network 110 to the telematics subsystem 102. Raw vehicle data transmitted and collected over a period of time forms historical vehicle data which may be stored by telematics subsystem 102 which may be considered a remote subsystem to the vehicles 114.

In practice, a monitoring device 104 is associated with a particular vehicle. For example, during configuration of monitoring devices 104, each thereof may be assigned a unique device ID that is uniquely associated with a vehicle information number (VIN) of vehicles 114. This enables an instance of received raw vehicle data to be associated with a particular vehicle. As such, vehicle-specific raw vehicle data may be discernable among other raw vehicle data in the historical vehicle data.

Three monitoring devices 104 are described in this example for explanation purposes only and embodiments are not intended to be limited to the examples described herein. In practise, a telematics system may comprise many vehicles 114, such as hundreds, thousands and tens of thousands or more. Thus, huge volumes of raw vehicle data may be received and stored by remote telematics subsystem 102.

In general, monitoring devices 104 comprise sensing modules configured for sensing and/or measuring a physical property that may indicate an operating condition of a vehicle. For example, sensing modules may sense and/or measure a vehicle's position, (e.g., GPS coordinates), speed, direction, rates of acceleration or deceleration, for instance, along the x-axis, y-axis, and/or z-axis, altitude, orientation, movement in the x, y, and/or z direction, ignition state, transmission and engine performance, and times of operation among others. One of ordinary skill in the art will appreciate that these are but a few types of vehicle operating conditions that may be detected.

Monitoring device 104 may comprise a sensing module for determining vehicle position. For instance, the sensing module may utilize Global Positioning System (GPS) technology (e.g., GPS receiver) for determining the geographic position (Lat/Long coordinates) of vehicle 104. Alternatively, the sensing module utilizes another a global navigation satellite system (GNSS) technology, such as, GLONASS or BeiDou. Alternatively, the sensing module may further utilize another kind of technology for determining geographic position. In addition, sensing module may provide other vehicle operating information, such as speed.

Alternatively, the monitoring device 104 may be communicate with a plurality of sensing modules for a vehicle.

Alternatively, vehicle position information may be provided according to another geographic coordinate system, such as, Universal Transverse Mercator, Military Grid Reference System, or United States National Grid.

In general, a vehicle 104 may include various control, monitoring and/or sensor modules for detecting vehicle operating conditions. Some specific and non-limiting examples include, an engine control unit (ECU), a suspension and stability control module, a headlamp control module, a windscreen wiper control module, an anti-lock braking system module, a transmission control module, and a braking module. A vehicle may have any combination of control, monitoring and/or sensor modules. A vehicle may include a data/communication bus accessible for monitoring vehicle operating information, provided by one or more vehicle control, monitoring and/or sensor modules. A vehicle data/communication bus may operate according to an established data bus protocol, such as the Controller Area Network bus (CAN-bus) protocol that is widely used in the automotive industry for implementing a distributed communications network. Specific and non-limiting examples of vehicle operation information provided by vehicle monitoring and/or sensor modules include, ignition state, fuel tank level, intake air temp, and engine RPM among others.

Monitoring device 104 may comprise a monitoring module operable to communicate with a data/communication bus of vehicle 114. Monitoring module may communicate via a direct connection, such as, electrically coupling, with a data/communication bus of vehicle 114 via a vehicle communication port, (e.g., diagnostic port/communication bus, OBDII port). Alternatively, monitoring module may comprise a wireless communication interface for communicating with a wireless interface of the data/communication bus of vehicle 114. Optionally, a monitoring module may communicate with other external devices/systems that detect operating conditions of the vehicle.

Monitoring device 104 may be configured to wirelessly communicate with telematics subsystem 102 via a wireless communication module. In some embodiments, monitoring device 104 may directly communicate with one or more networks outside vehicle 114 to transmit data to telematics subsystem 102. A person of ordinary skill will recognize that functionality of some modules may be implemented in one or more devices and/or that functionality of some modules may be integrated into the same device.

Monitoring devices 104-106 may transmit raw vehicle data, indicative of vehicle operation information collected thereby, to telematics subsystem 102. The raw vehicle data may be transmitted at predetermined time intervals, (e.g. heartbeat), intermittently, and/or according to other predefined conditions. Raw vehicle data transmitted from monitoring devices 104-106 may include information indicative of device ID, position, speed, ignition state, and date and time operating conditions are logged, for instance, in an onboard datastore. One of ordinary skill in the art will appreciate that raw vehicle data may comprise data indicative of numerous other vehicle operating conditions. Raw vehicle data may be transmitted from a monitoring device when a vehicle is moving, stationary, and during both ON and OFF ignition states.

In an exemplary embodiment, raw vehicle data received and stored by a subsystem over a period of time forms historical vehicle data. In an exemplary embodiment, historical vehicle data may be stored by telematics subsystem 102 in a database, such as data management system 120, as shown. A period of time may include, for example, 3 months, 6 months, 12 months, or another duration of time.

Figure 2:
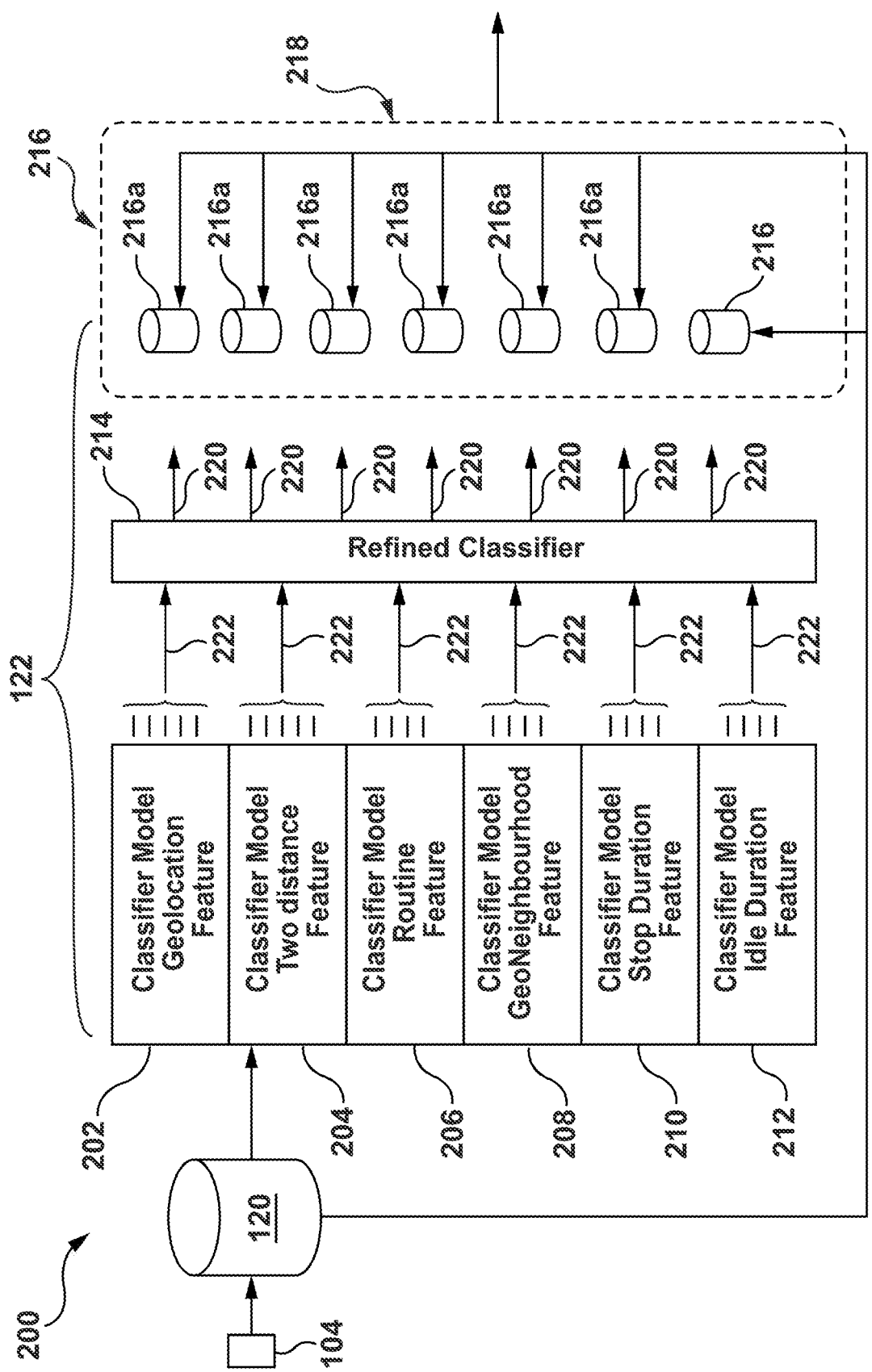
FIG. 2 is a diagrammatic view of an embodiment of a telematics vehicle vocation classifier and benchmarking system.

Referring to FIG. 2, there is shown an exemplary embodiment of the telematics subsystem 102 comprising a telematics vehicle vocation classifier and benchmarking system 122 in communication with data management system 120 for access to the historical vehicle data communicated thereto by monitoring device 104 for each vehicle 114. The inventors realized and recognized the telematics vehicle vocation classifier and benchmarking system 122 may comprise multiple intermediate vocation classifiers 202, 204, 206, 208, 210, and 212 for different vehicle vocation predictions which classifiers analyse different features of the collected data. These intermediate classifiers may have vocation probability outputs or define new feature outputs that are then fed into a further or refined prediction classifier 214 to arrive at different predictions 220 of vehicle vocation based. In some instances, the output of the intermediate classifiers may be indicative of a prediction of vehicle vocation. The output predictions of vocation from classifier 214 are communicated to benchmarking management system 216 where data is organized by at least vehicles of the same vocation, as illustrated by benchmarking management subsystems 216a, and analysed to determine vehicles having improved performance against which other vehicles of like vocation may be benchmarked. It should be understood that the subsystems 216a may be subset modules of system 216 or alternatively may be found within system 216.

It should be understood that multiple classifiers 202-214 are employed in the embodiment of FIG. 2 where classifiers prior to the refined classifier are termed intermediate classifiers. The intermediate classifiers are shown in a column or parallel relation and then connected in series to the refined classifier. It should be understood that this represents an embodiment of network topography. In another embodiment of network topography may include comprise one or more intermediate classifiers interposed between the first column of intermediate classifiers and the refined classifier. In another embodiment of network topography, an intermediate classifier may output a new feature for a downstream intermediate classifier. In yet another embodiment, more than one refined classifier may be present. In another embodiment, an intermediate classifier and/or a refined classifier may be response to output from an intermediate classifier and/or output of data from the data management system.

Classifier Vocation Training

Prior to implementing an embodiment for a telematics vehicle vocation classifier and benchmarking system 122, the inventors recognized and realized that due to insufficient labelled vehicle vocation data that multiple intermediate vocation classifiers may have to be trained to predict different vehicle vocations. The inventors developed a process of selecting or extracting vehicle usage parameters (a feature) from the collected data for each vehicle over a predetermined time period and organizing these features. The inventors recognized and realized that to determine if the organization of these features resulted in a prediction of vehicle vocation, the features of the vehicle having a predictable vocation should result in a recurring behavioural execution pattern that may be identifiable by a single dimension pattern or a multi-dimensional pattern. The inventors realized and appreciated that the vehicle usage parameters could be organized as one, two, three or four dimensions, or multi-dimensions. An example of a single dimension would be a series array of vehicle usage parameters. An example of a 2-dimensional pattern organized from 2 vehicle parameters would be an image or representation. An example of 3 and 4 dimensions would be adding color and/or data point sizing to an image or representation. In the embodiments described hereafter, the patterns were determined either from organizing a series of single usage parameters over time or from organizing a series of 2 associated vehicle usage parameters over time.

The inventors realized that organizing of 2 associated vehicle usage parameters to identify a vehicle having a 2-dimensional pattern of recurring behavioural execution could then be assigned a vocation to that vehicle. In some embodiments, the inventors realized that a single vehicle usage parameter could be utilized to identify a pattern of recurring behavioural execution. This resulted in vocation labelled vehicle data and/or feature data being used as training data suitable for supervised learning of a machine learning technique of a classifier for data having the feature. In an embodiment the machine learning technique is a random forest generator. In other embodiments the machine learning technique may apply the use of a neural network or CNN network.

In an embodiment, the historical data collected by the telematics system and used to train the classifiers is stored in data management system 120 of FIG. 1 and may include data for all vehicles in one or more fleets and/or the ecosystem for the Applicant. This data may include for example GPS data, trips data, and some vehicle labelling. The GPS data is collected by Geotab's curved algorithm and the GPS data has the Latitude and Longitude locations where the vehicle has visited. The trips data has the timestamp when the trip begins, when the trip ends, the distance travelled during the trip, the amount of idling during the trip and the driving duration. For some of the vehicles, where the vocation of that vehicle is known, labelling of the vehicle data with the vocation may form part of the overall data. The trip data may further be enriched with the start and stop location of each trip. In an embodiment, this data may be used initially in the training of vocation classifiers and subsequently in the prediction of vehicle vocation.

Figure 3:
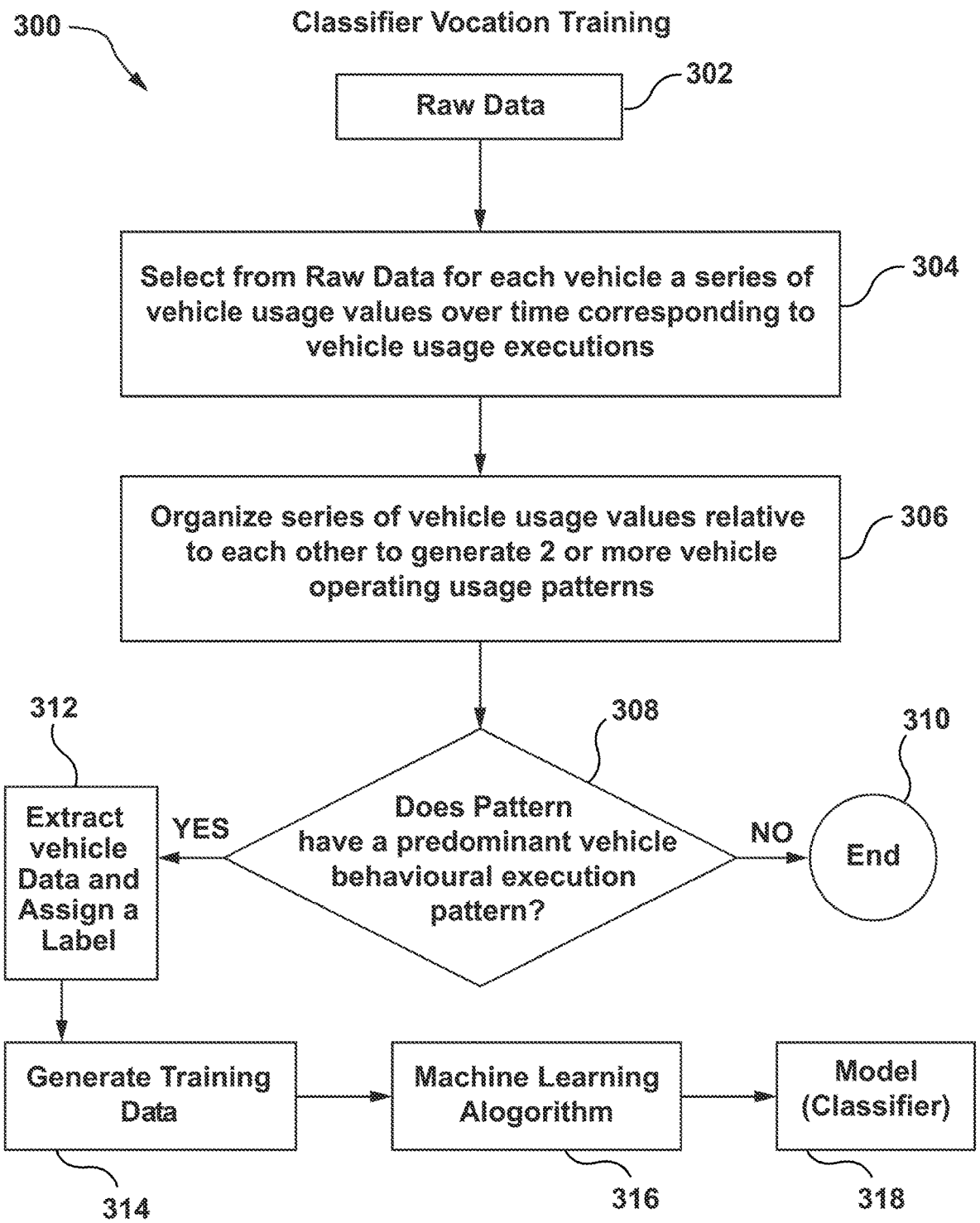
FIG. 3 is a diagrammatic view of an exemplary flow chart for classifier vocation training.
Figure 4A:
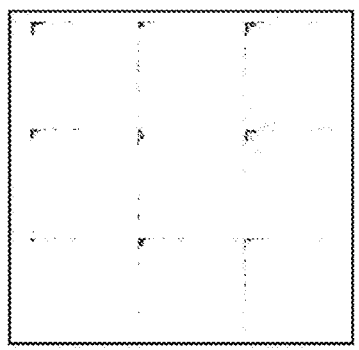
FIGS. 4a through 4e are diagrammatic views of 5 heat maps (shown in reverse contrast) representing corresponding predominant vehicle behavioral execution patterns organized and determined from a Geolocation feature.
Figure 4B:
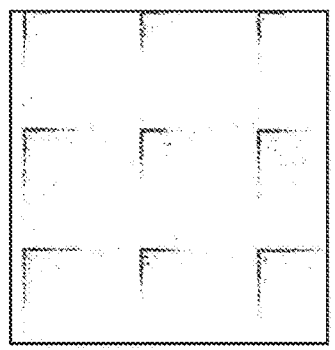
Figure 4C:
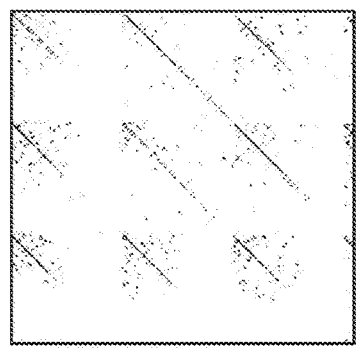
Figure 4D:
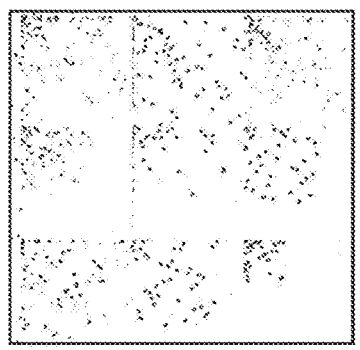
Figure 4E:
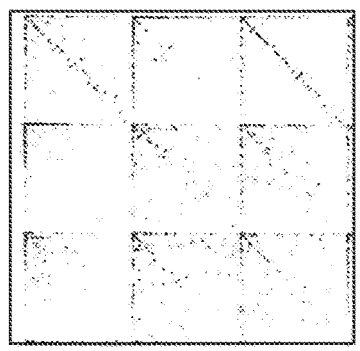
Figure 5A:
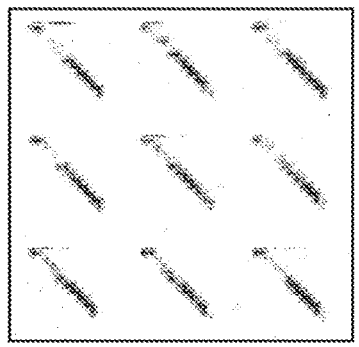
FIGS. 5a through 5g are diagrammatic views of 7 heat maps (shown in reverse contrast) representing corresponding predominant vehicle behavioral execution patterns organized and determined from a Two Distance feature.
Figure 5B:
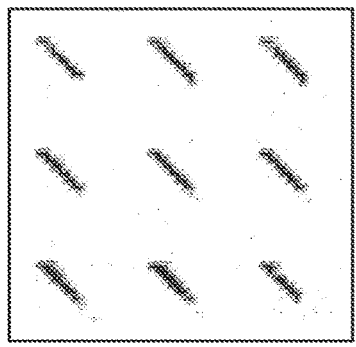
Figure 5C:
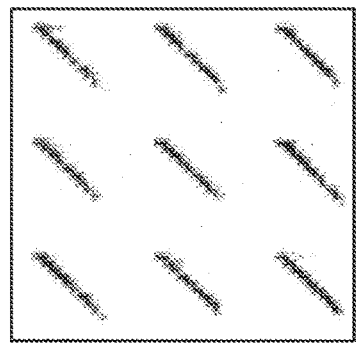
Figure 5D:
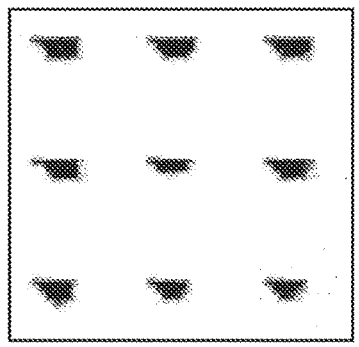
Figure 5E:
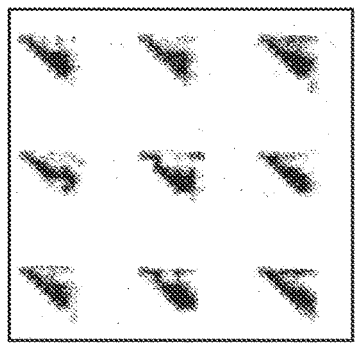
Figure 5F:
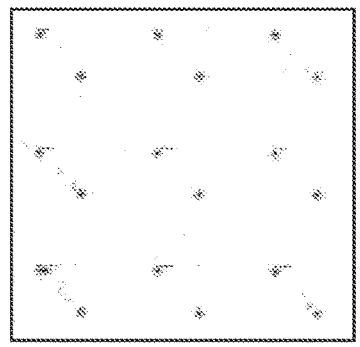
Figure 5G:
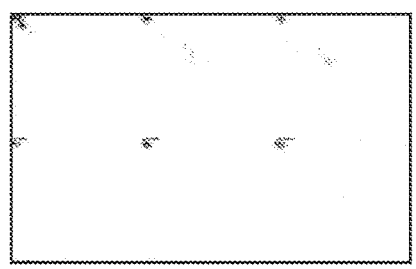
Figure 6A:
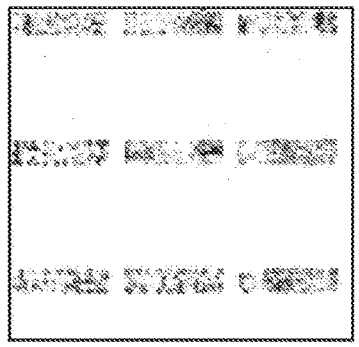
FIGS. 6a through 6f are diagrammatic views of 6 heat map (shown in reverse contrast) representing corresponding predominant vehicle behavioral execution patterns organized and determined from a Routine feature.
Figure 6B:
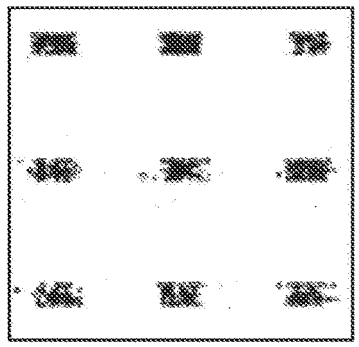
Figure 6C:
Figure 6D:
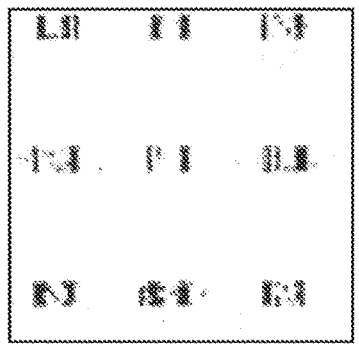
Figure 6E:
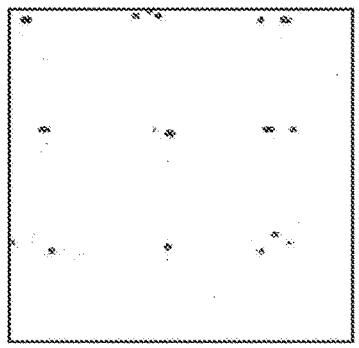
Figure 6F:
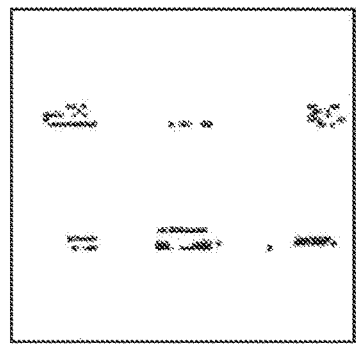

Referring to FIG. 3 there is shown a flow chart for Classifier Vocation Training 300. Historical data is stored at 302 in database management system 120 and this data may comprise the subset of data discussed in the preceding paragraph. For each vehicle of a plurality of vehicles, a series of vehicle usage values over time that correspond to vehicle usage executions are selected or determined at step 304 from the raw data 302. The series of vehicle usage values may comprise a series of singular usage values or a series of multiple associated usage values. The vehicle usage values form the feature are chosen independent of vehicle fleet groupings, industry vehicle application groupings and vehicle type groupings. The Next at step 306, the series of vehicle usage values are organized relative to each other to generate two or more single or multi-dimensional vehicle operating usage patterns. At 308, the generated operating usage patterns are reviewed to determine if the usage pattern has a predominant vehicle behavioral execution pattern. If not, the selected data is rejected for this vehicle at 310. If the pattern has a predominant vehicle execution pattern, then the vehicle data is extracted and a label is assigned to this vehicle data at 312. The label assigned may be a vocation label, an intermediate vocation label or a feature label. Next, training data from the label and the extracted data is generated at 314 and fed to a machine learning algorithm at 316 which trains the classifier 318. Once trained, the classifier 318 predicts the vehicle vocation parameter independent of vehicle fleet groupings, industry vehicle application groupings and vehicle type groupings. The vehicle vocation parameter may be an intermediate vocation for the vehicle, a new vocation feature, and a vocation for the vehicle. Examples of the classifier 318 used to predict the vocation parameter are shown in FIG. 2. The classifiers 202-212 and refined classifier 220 are examples of classifiers trained by the process of FIG. 3.

The inventors have identified in embodiments features related to Geolocation, Two Distance, Routine, Geo Neighbourhood, Stop Duration and Customer Location, and Idling Duration and Driving Duration with a view to developing multiple intermediate classifier models trained through use of these features. The inventors have trained these intermediate classifier models to be able to generate vehicle vocation parameters which parameters may comprise labels, feature labels, intermediate vehicle vocation labels, and a vehicle vocation label. The training of each of these models is different and is now described. However, it should be understood that the following discussion relates to embodiments determined by the inventors and that other different techniques and algorithms may be utilized to extract these features such as, for example, a network of the vehicle may be constructed and using Graph Theory features can be extracted that are related to network topography. This network topography may be used to train classifier models.

Geolocation Classifier Vocation Training

In one embodiment a classifier is trained by a Geolocation feature. In this embodiment, the last 3 months of data for each vehicle is used as input for the Geolocation classifier. From the historical vehicle data a series over time of two associated usage values such as, for example, the start and stop location of the vehicle for each trip by the vehicle is determined or selected. This information may be, for example, in Level 8 Geohash format.

Next the selected data may be organized by ordering and ranking the selected data relative to each other to graphically generate one or more 2-dimensional vehicle operating usage patterns. In this embodiment, the selected data may be organized by ordering and ranking the selected data in a 50*50 matrix representing the Geolocation feature. The process involves:

Find the top 50 most frequently visited Geolocation from trips. Order and rank them based on frequency where the most frequently visited location at position zero.

Initialize a 50 by 50 matrix with zeros. Represent the matrix as Matrix [i, j] where i is row index and j is the column index.

Go over all trips for a vehicle for last three months.
Find the start location and stop location of the trip.
Check if both locations are in top 50 location. If so then
Find the rank of the start and stop locations x and y.
Increment count of Matrix [x, y] position After going over each trip and incrementing the corresponding position in the matrix, a final Matrix is obtained. Then all elements in the matrix are summed and each position in the matrix is normalized. The final matrix may be used to represent one or more 2-dimensional (start and stop location) vehicle operating usage patterns. In this embodiment, the 5 patterns shown in FIG. 4 and described in Table 1 represent 5 intermediate vocations identified by this process for different vehicles of Low Customer, Hub and Spoke, Routed, Noisy, and Routed Hub and Spoke (see FIGS. 4a to 4e, respectively). Each of FIGS. 4a through 4e represents heat maps for 9 vehicles displaying like patterns. Further, it should be understood that some vehicles may not have a recognizable recurring pattern and hence cannot be labelled. From FIG. 4a through 4e each pattern is representative of a corresponding predominant vehicle behavioral execution pattern and can be labelled as an intermediate vocation or class.

TABLE 1

| FIG. | Intermediate Class (Multi Class-Vocation) | Feature | Description |
| --- | --- | --- | --- |
| 4a | Low Customer | Geolocation | Visits less than 15 customer locations. Graph shows diagonal pattern. |
| 4b | Hub and Spoke | Geolocation | Most trips either start or stop at the hub. Graph shows L shaped pattern) |
| 4c | Routed | Geolocation | Most trips start and stop at the same location. Graph shows Dots with a few points. |
| 4d | Noisy | Geolocation | Hard to predict from geolocation feature. Graphs shows random points. |
| 4e | Routed-Hub and Spoke | Geolocation | Have many trips start and stop at same location and also many trips that start or stop at a hub. Graphs shows both L and Diagonal patterns |

After having identified vehicles having the patterns described in Table 1, data may be extracted for vehicles having the determined corresponding predominant vehicle behavioral execution patterns and a label corresponding to the determined predominant vehicle behavioral execution pattern is assigned to this extracted vehicle data. Training data may then be generated from this labeled vehicle data. The training data may then be used with at least one machine learning technique to define a classifier for classifying a vehicle vocation parameter based on a Geolocation feature independent of vehicle fleet groupings, industry vehicle application groupings and vehicle type groupings.

Two Distance Classifier Vocation Training

In an embodiment a classifier is trained by a Two Distance feature. In this embodiment, the last 3 months of data for each vehicle is used as input for the Two Distance classifier. From the historical vehicle data a series over time of two associated usage values such as, for example, trip distance and point to point distance for each trip by the vehicle is determined or selected.

Next the selected data may be organized by ordering and ranking the selected data relative to each other to graphically generate one or more 2-dimensional vehicle operating usage patterns. In this embodiment, the selected data may be organized by ordering and ranking the selected data in a 17*17 matrix representing the Two Distance feature. The process involves:

Initializing a 17*17 Matrix with zeros and representing the matrix as Matrix[i,j] where i is row index and j is the column index.
Go over all trips for a vehicle for last three months.
Compute the log of actual distance traveled from the trip and denoting the log by A
Computing the log of direct distance traveled from the trip and denoting the log by B
Increment Matrix[A, B] by one
Rounding to 17 if value of A or B is more than 17.
After going over each trip and incrementing the corresponding position in the matrix, the final Matrix is obtained. We take the sum of all elements in the matrix and normalize each position in the matrix.

The Two Distance feature represents a relationship between total distance and direct distance in each trip. The total distance is the total traveling distance of the vehicle in km. The direct distance is the straight-line distance in km. The X-axis is the total distance and the Y axis is the direct distance.

The final matrix may be used to represent one or more 2-dimensional (total distance and direct distance traveled) vehicle operating usage patterns. In this embodiment, the 7 patterns shown in FIG. 5 and described in Table 2 represent 7 intermediate vocations or classes identified by this process for different vehicles of Direct Long Distance, Direct Short Distance, Direct Long and Short Distance, Circular, Direct and Circular Combined, Two Point and One Point (see FIGS. 5a to 5g, respectively). Each of FIGS. 5a through 5g represents heat maps for 9 vehicles displaying like patterns. Further, it should be understood that some vehicles may not have a recognizable recurring pattern and hence cannot be labelled. From FIG. 5a through 5g each pattern is representative of a corresponding predominant vehicle behavioral execution pattern and can be labelled.

TABLE 2

| FIG. | Intermediate Class (Multi Class - Vocation) | Feature | Description |
| --- | --- | --- | --- |
| 5a | Direct Long Distance | Two Distance | Travels long point to point and long road distance |
| 5b | Direct Short Distance | Two Distance | Travels short point to point and short road distance |
| 5c | Direct Long & Short Distance | Two Distance | Travels point to point, in both long and short distance. |
| 5d | Circular | Two Distance | Travels short point to point and long road distance |
| 5e | Direct & Circular Combined | Two Distance | Travel both point to point and circular trips |
| 5f | Two Point | Two Distance | Travels between two locations |
| 5g | One Point | Two Distance | Travel short distance around one location |

After having identified vehicles having the patterns descripted in Table 2, data may be extracted for vehicles having the determined corresponding predominant vehicle behavioral execution patterns and a label corresponding to the determined predominant vehicle behavioral execution pattern is assigned to this extracted vehicle data. Training data may then be generated from this labeled vehicle data. The training data may then be used with at least one machine learning technique to define a classifier for classifying a vehicle vocation parameter based on a Two Distance feature independent of vehicle fleet groupings, industry vehicle application groupings and vehicle type groupings.

Routine Classifier Vocation Training

In an embodiment a classifier is trained by a Routine feature. In this embodiment, the last 3 months of data for each vehicle is used as input for the Routine classifier. From the historical vehicle data a series over time of two associated vehicle usage values such as, for example, the hour of day and the day of week of trip start time is determined or selected. In an embodiment the weekend data was omitted as some vehicles display random usage on weekends.

Next the selected data may be organized by ordering and ranking the selected data relative to each other to graphically generate one or more 2-dimensional vehicle operating usage patterns. In this embodiment, the selected data may be organized by ordering and ranking the selected data in a 28*28 matrix representing the Routine feature. The process involves:

Initializing a 28*28 Matrix with zeros and representing the matrix as Matrix[i,j] where i is row index and j is the column index.

Go over all trips for a vehicle for last three months.
    From Start time find the hour h and the day of week d when the trip started.
    Increment Matrix[h, d] by one
    After going over each trip and incrementing the corresponding position in the matrix, the final Matrix is achieved. All elements in the matrix are summed and each position in the matrix is normalized.

The Routine feature represents a relationship between time of day of vehicle operation and days of week of vehicle operation. The X-axis is hour of the day and the Y axis is day of the week. Each cell represents the number of trips starting at that hour and day of the week.

The final matrix may be used to represent a one or more 2-dimensional (hours of the day and day of the week) vehicle operating usage patterns. In this embodiment, the 7 patterns shown in FIG. 6 and described in Table 3 represent 6 intermediate vocations or classes identified by this process for different vehicles of Twenty-Four Hour active, Nine to Five, Nights, Morning and Afternoon, Few Hours a Few Days and Whole Day for Few Days (see FIGS. 6a to 6f, respectively). Each of FIGS. 6a through 6f represents heat maps for 9 vehicles displaying like patterns or vocation. Further, it should be understood that some vehicles may not have a recognizable recurring pattern and hence cannot be labelled. From FIG. 6a through 6f each pattern is representative of a corresponding predominant vehicle behavioral execution pattern and can be labelled.

TABLE 3

| FIG. | Intermediate Class (Multi Class - Vocation) | Feature | Description |
| --- | --- | --- | --- |
| 6a | Twenty Four Hour | Routine | Travels 24 hours a day. No specific time of the day. |
| 6b | Nine to Five | Routine | Most trips start or stop between nine to five. |
| 6c | Night | Routine | Have some trips at night. |
| 6d | Morning and Afternoon | Routine | Some trips in the morning and some trips in the afternoon. |
| 6e | Few Hours Few Days | Routine | Only active few hours and only few days |
| 6f | Whole Day Few Days | Routine | Active whole day but only few days |

After having identified vehicles having the patterns described in Table 3, data may be extracted for vehicles having the determined corresponding predominant vehicle behavioral execution patterns and a label corresponding to the determined predominant vehicle behavioral execution pattern is assigned to this extracted vehicle data. Training data may then be generated from this labeled vehicle data. The training data may then be used with at least one machine learning technique to define a classifier for classifying vehicle vocation parameter based on a Routine feature independent of vehicle fleet groupings, industry vehicle application groupings and vehicle type groupings.

Geo Neighbourhood Classifier Vocation Training

In an embodiment a classifier is trained by a Geo Neighbourhood feature. In this embodiment, the last 3 months of data for each vehicle is used as input for the Geo Neighbourhood classifier. From the historical vehicle data a series over time of two associated vehicle usage values such as, for example, start and stop location for each trip is determined or selected.

Next the selected data may be organized by ordering and ranking the selected data relative to each other to graphically generate one or more 2-dimensional vehicle operating usage patterns. In this embodiment, the selected data may be organized by ordering and ranking the selected data in a 25*25 matrix representing the Geo Neighbourhood feature. The process involves:

Convert start and end of all trip to geohash level 4 (Repeat the same process for geohash 5 and 6).
    Initialize a 25*25 Matrix with zeros. Represent the matrix as Matrix[i,j] where i is row index and j is the column index.
    Determine the central location where most trip starts or stops.
    Put this location in the middle of the matrix at location (13,13). Create a dictionary or look up table that translates location to row and col index in the matrix
    Go over all trips for a vehicle for last three months.
        Convert the start and stop location to geohash4.
        Use dictionary d to get the row index i and col index j. If location not present in the dictionary then skip the location.
        Increment Matrix[i, j] by one
    After going over each trip and incrementing the corresponding position in the matrix the final Matrix is obtained. Sum all elements in the matrix and normalize each position in the matrix.
    Repeat the same process for geohash 5 and geohash 6.

The Geo Neighbourhood feature is based on the vehicle's activity area by looking at an area of neighboring geohashes at different scales. There are three patterns that for this feature of Local Area, Spread Area, and Long-distance Area.

This process for each geohash square, starts from the central geohash with the highest visiting frequency, and get its neighbouring **25*25** geohashes. The Geohash6 has a square area: 30 km*15 km, Geohash5 has a square area: 120 km*120 km, and Geohash4 square area of 1000 km*500 km. The Cell represents he number of trips stopped at that geohash. The values in the matrix are normalized between 0-1.

Figure 7A:
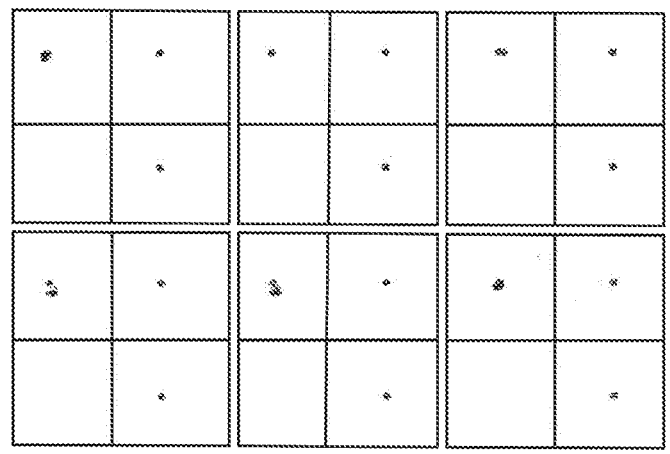
FIGS. 7a through 7c are diagrammatic views of 3 heat map (shown in reverse contrast) representing corresponding predominant vehicle behavioral execution patterns organized and determined from a Geo-Neighborhood feature.
Figure 7B:
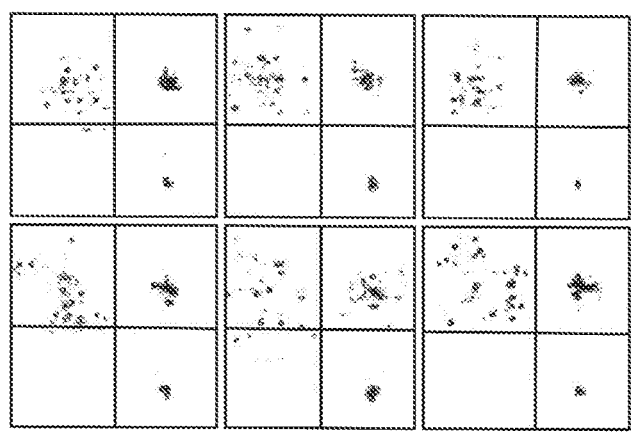
Figure 7C:
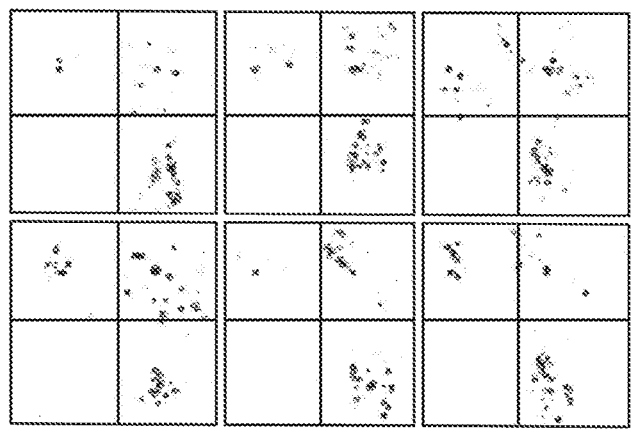
Figure 8A:
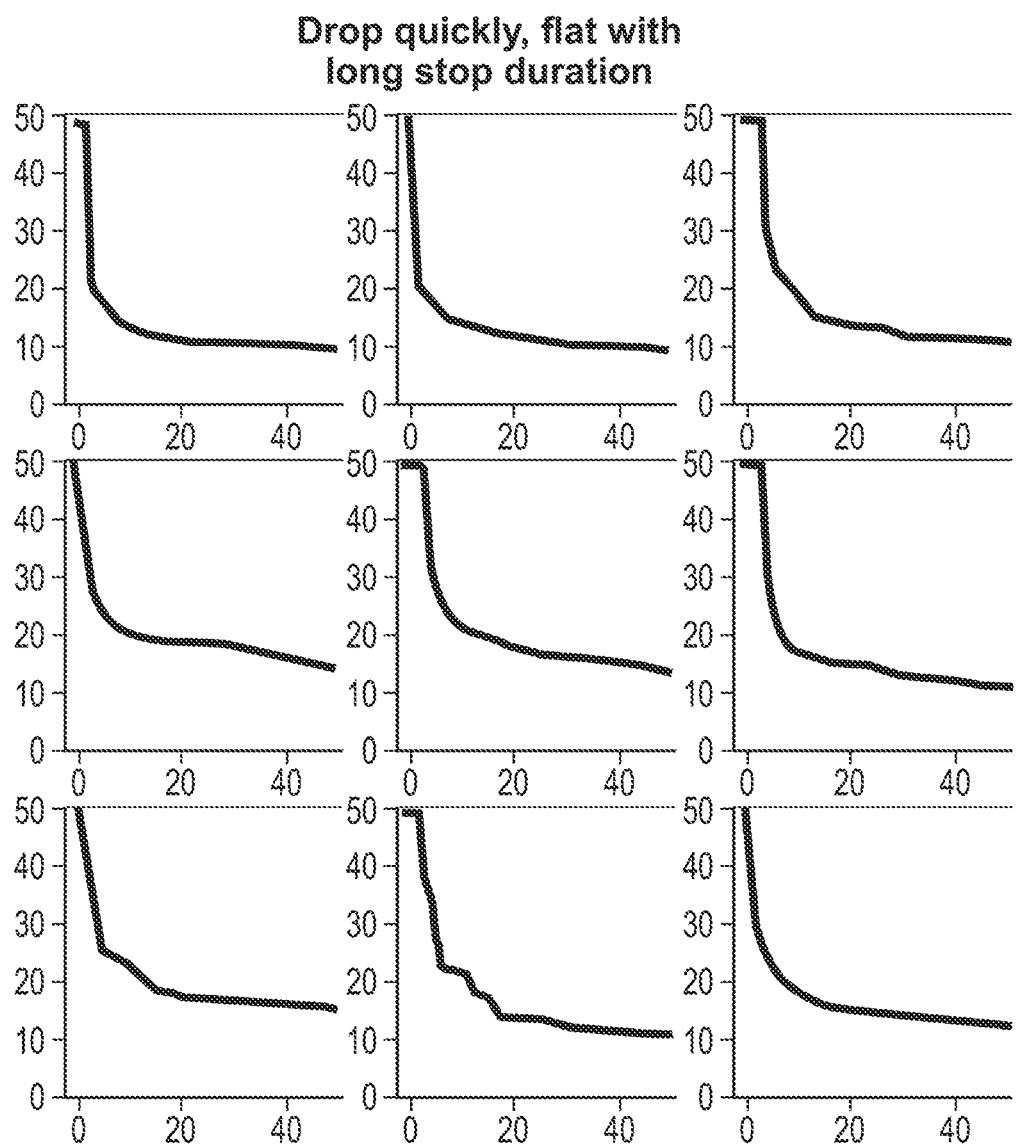
FIGS. 8a through 8e are diagrammatic views of 5 heat map (shown in reverse contrast) representing corresponding predominant vehicle behavioral execution patterns organized and determined from a from a Stop Duration and Customer Location feature.
Figure 8B:
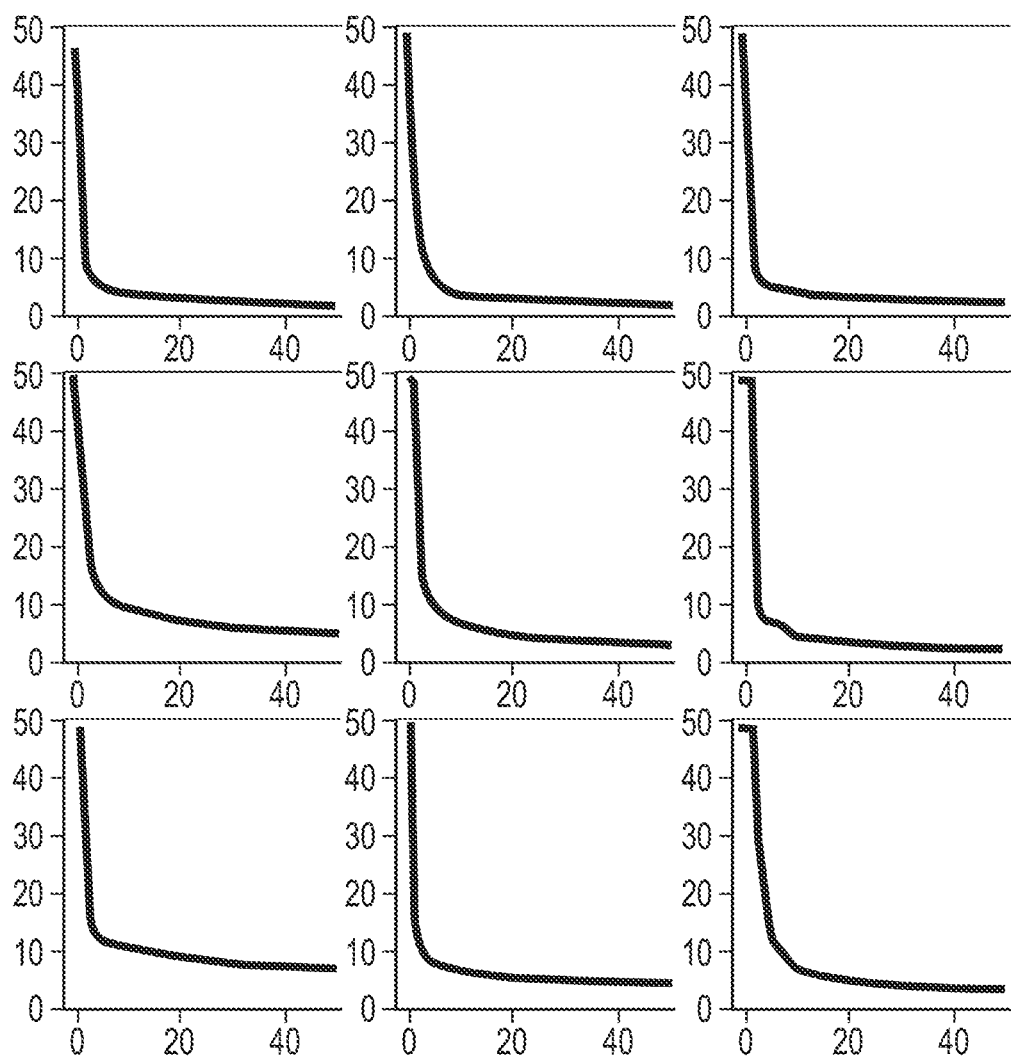
Figure 8C:
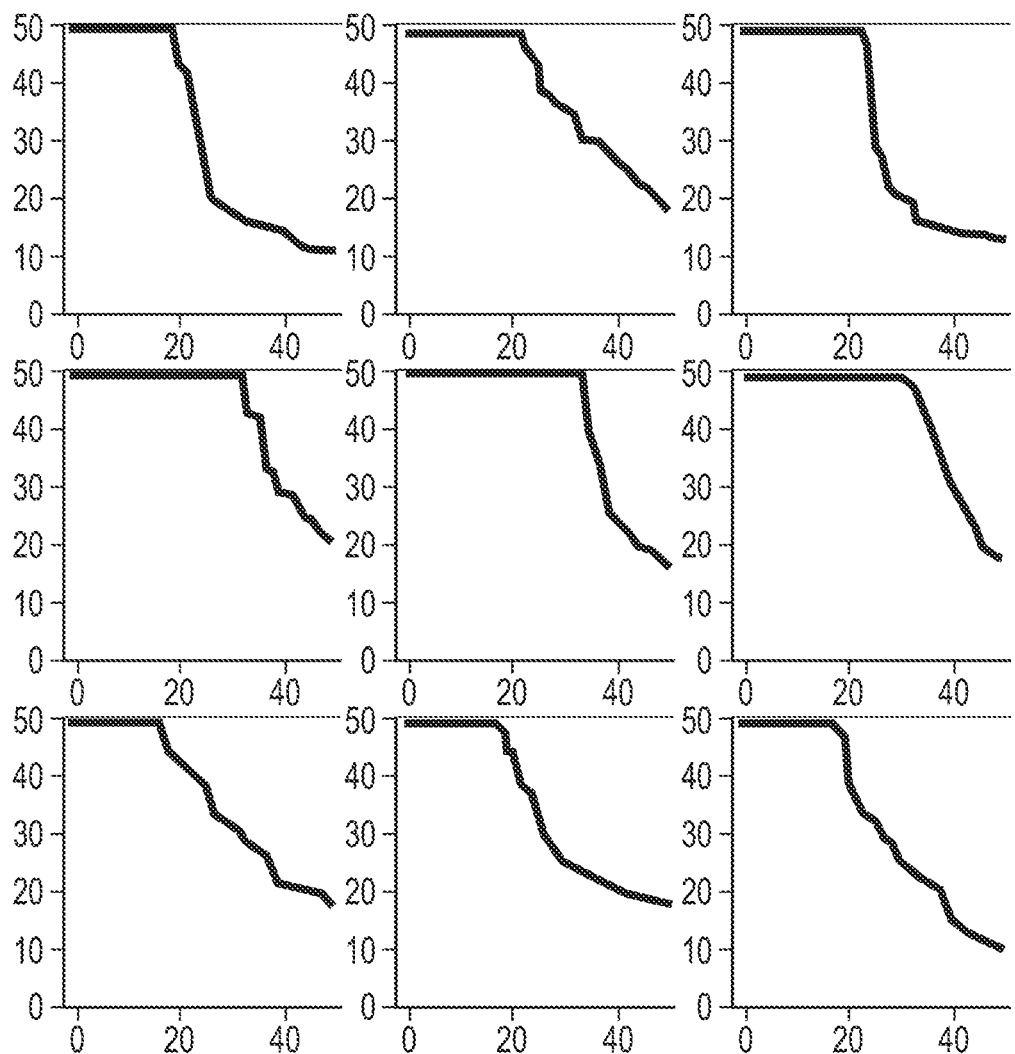
Figure 8D:
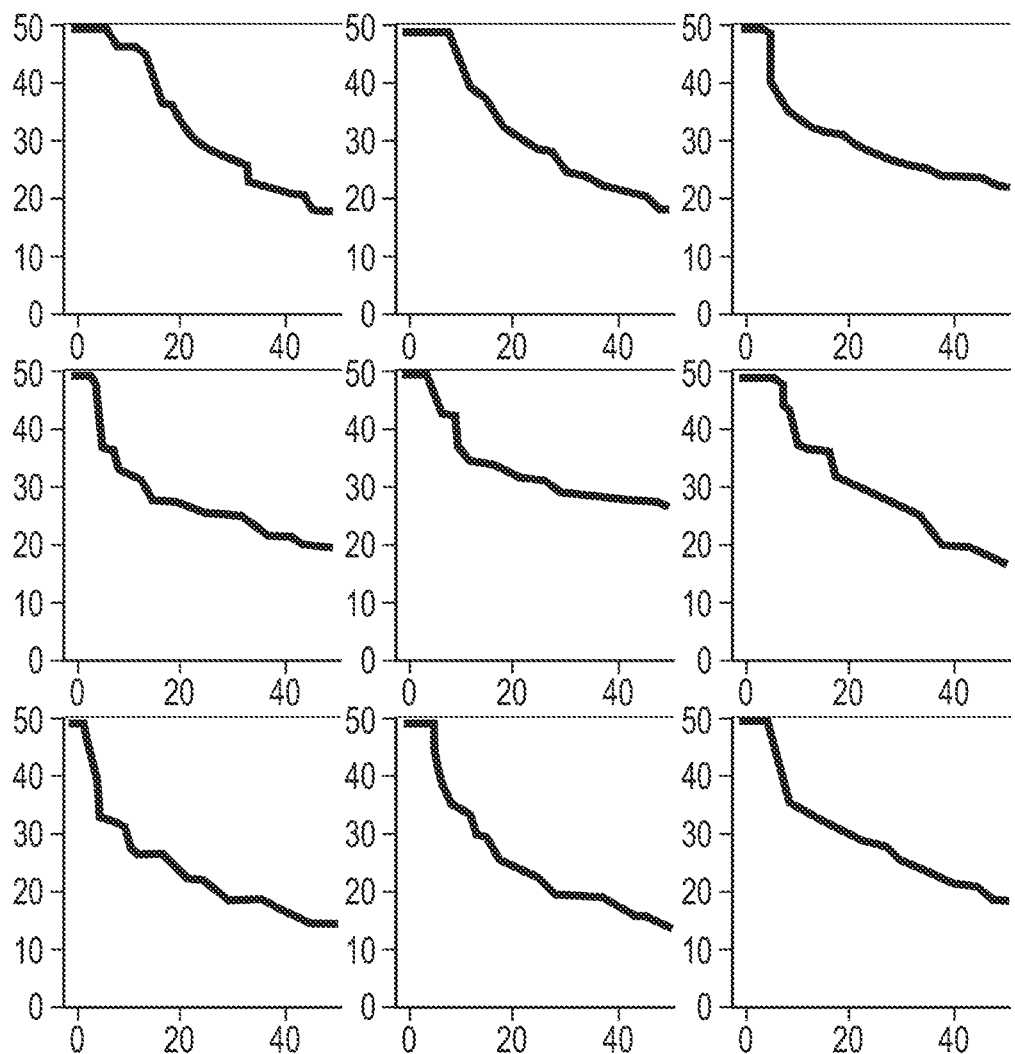
Figure 8E:
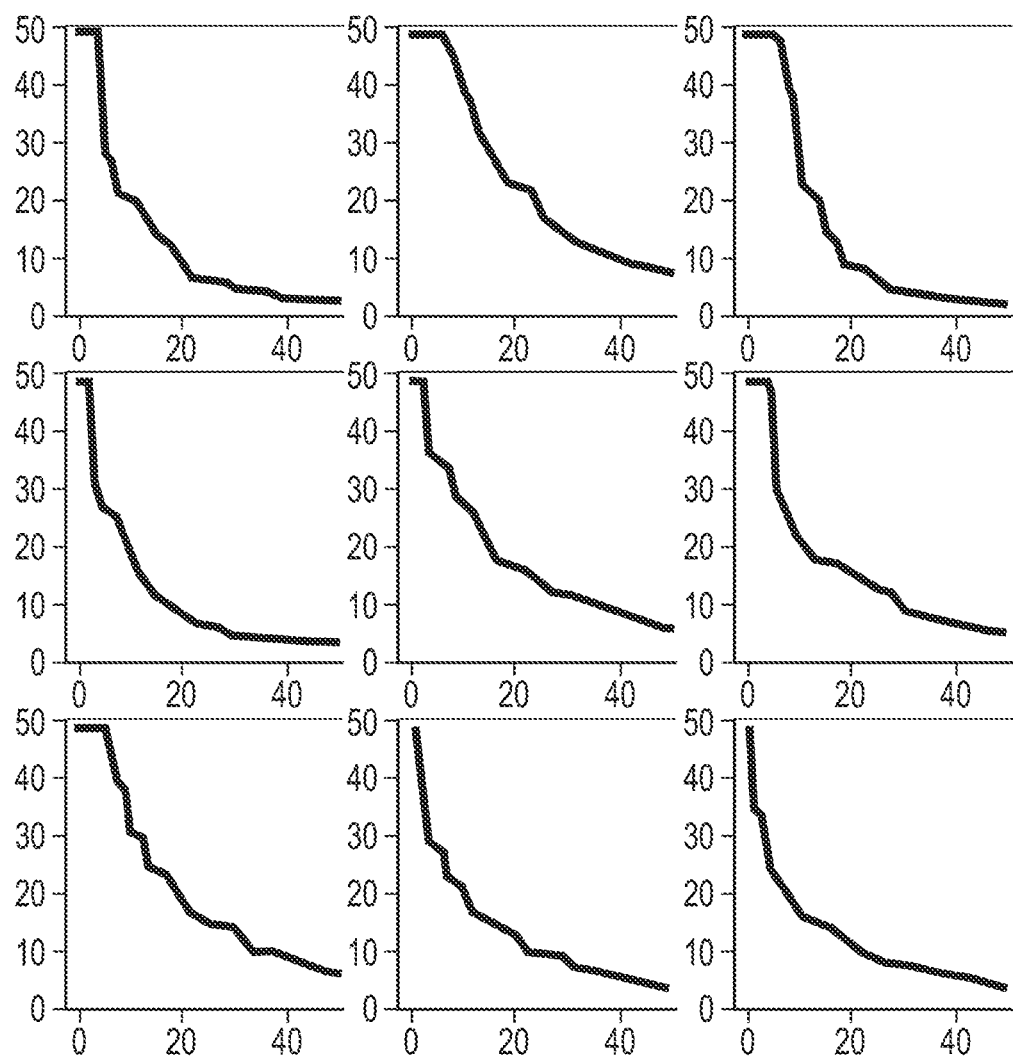
Figure 9A:
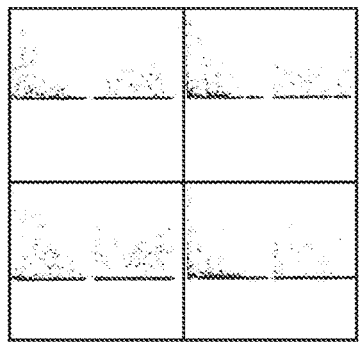
FIGS. 9a through 9f are diagrammatic views of 6 heat map (shown in reverse contrast) representing corresponding predominant vehicle behavioral execution patterns organized and determined from a idling Duration and Driving Duration feature; and, FIG. 10 is a diagrammatic view of an exemplary flow classifying vehicles by vocation and benchmarking vehicles of same vocation relative to each other.
Figure 9B:
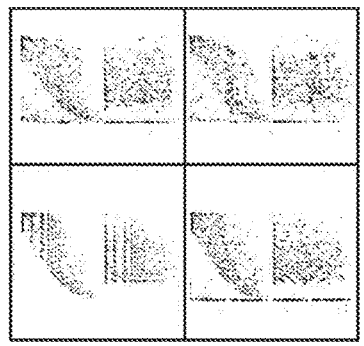
Figure 9C:
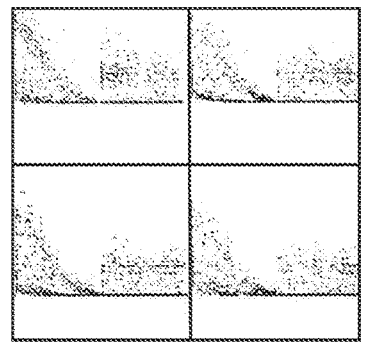
Figure 9D:
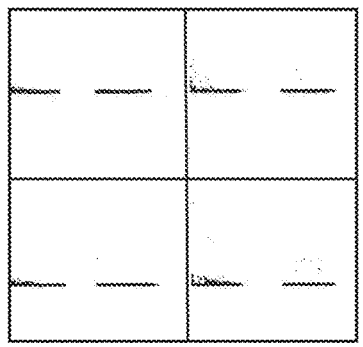
Figure 9E:
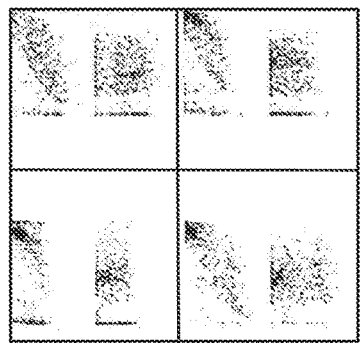
Figure 9F:
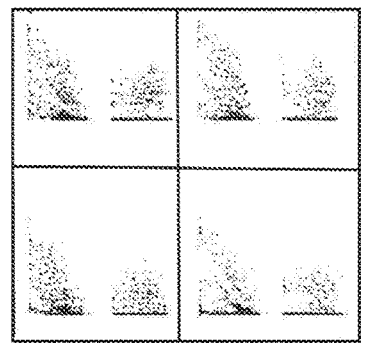

The final matrix may be used to represent a one or more 2-dimensional vehicle operating usage patterns. In this embodiment, the 7 patterns shown in FIG. 7 and described in Table 4 represent 3 intermediate vocations or classes identified by this process as set out in Table 4 (also see FIGS. 7a to 7c, respectively).

TABLE 4

| FIG. | Intermediate Class (Multi Class) | Feature | Description |
| --- | --- | --- | --- |
| 7a | Local Area | Geo Neighbourhood | Active in a small geo neighbourhood. |
| 7b | Spread Area | Geo Neighbourhood | Active in medium geo neighbourhood. |
| 7c | Long distance Area | Geo Neighbourhood | Active in a large geo neighbourhood. |

After having identified vehicles having the patterns described in Table 4, data may be extracted for vehicles having the determined corresponding predominant vehicle behavioral execution patterns and a label corresponding to the determined predominant vehicle behavioral execution pattern is assigned to this extracted vehicle data. Training data may then be generated from this labeled vehicle data. The training data may then be used with at least one machine learning technique to define a classifier for classifying vehicle vocation parameters based on a Geo Neighbourhood feature independent of vehicle fleet groupings, industry vehicle application groupings and vehicle type groupings.

Stop Duration Feature Classifier Vocation Training

In one embodiment a classifier is trained by a Stop Duration feature. In this embodiment, the last 3 months of data for each vehicle is used as input for the Stop Duration classifier. From the historical vehicle data a series over time of vehicle usage values such as, for example, the stop location and stop duration for each trip by the vehicle is determined or selected.

Next the selected data may be organized by ordering and ranking the selected data relative to each other to generate vehicle trip stop location and stop duration operating usage patterns. In this embodiment, the selected data may be organized by ordering and ranking the selected data in an array of length representing the stop duration feature. The process involves:

Convert stop location of all trip to geohash level 7.
For each vehicle find top 50 location where the vehicle has highest avg stop duration.
Rank these locations based on avg stop duration.
Initialize a length 50 array with zeros
Copy the avg stop duration of each location based on rank (Location with highest stop duration at index zero).
Normalize the array.

This feature calculates the average stop duration at top 50 locations (at geohash 7 level–153 m×153 m). The X-axis is the top 50 locations and the Y-axis is the average stop duration.

This feature contains 5 classes relating to the 5 patterns shown in FIGS. 8a to 8e and described in Table 5 as Flat Long Stop, Flat Short Stop, Most Long Stop, Sharp Long Stop and Sharp Short Stop. From FIG. 8a through 8e each pattern is representative of a corresponding predominant vehicle behavioral execution pattern and can be labelled.

TABLE 5

| FIG. | Intermediate Class (Multi Class) | Feature | Description |
|---|---|---|---|
| 8a | Flat Long Stop | Stop Duration and Customer Location | Long stop duration in most customer location. |
| 8b | Flat Short Stop | Stop Duration and Customer Location | Short stop duration in most customer location. |
| 8c | Most Long Stop | Stop Duration and Customer Location | Very long stop at most locations |
| 8d | Sharp Long Stop | Stop Duration and Customer Location | Long stop duration in some customer location but drops off rapidly |
| 8e | Sharp Short Stop | Stop Duration and Customer Location | Short stop duration in some customer location but drops off rapidly |

After having identified vehicles having the patterns described in Table 5, data may be extracted for vehicles having the determined corresponding predominant vehicle behavioral execution patterns and a label corresponding to the determined predominant vehicle behavioral execution pattern is assigned to this extracted vehicle data. Training data may then be generated from this labeled vehicle data. The training data may then be used with at least one machine learning technique to define a classifier for classifying vehicle vocation parameter based on a Stop Duration feature independent of vehicle fleet groupings, industry vehicle application groupings and vehicle type groupings.

Idling Duration and Driving Duration Classifier Vocation Training

In one embodiment a classifier is trained by an Idling Duration and Driving Duration feature. In this embodiment, the last 3 months of data for each vehicle is used as input for the Idling Duration and Driving Duration classifier. From the historical vehicle data a series over time of two associated vehicle usage values such as, for example, the idling duration and the driving duration of the vehicle for each trip by the vehicle is determined or selected.

Next the selected data may be organized by ordering and ranking the selected data relative to each other to graphically generate one or more 2-dimensional vehicle operating usage patterns. In this embodiment, the selected data may be organized by ordering and ranking the selected data in two 50*50 matrices representing the Idling Duration and Driving Duration feature. One is identified as MatrixIdleDuration and the other is identified as MatrixIdlePerc. This feature calculates the relationship between idling duration and driving duration. There are two parts, the left pattern is the percentage of idling duration out of the total trip duration and the right pattern is the driving duration value versus the idling duration value. The X-axis represents Driving Duration and the Y-axis represents:

$$\frac{\text{Idling Duration}}{\text{IdlingDuration} + \text{DrivingDuration}}.$$

The process involves:
Initialize a 50*50 Matrix with zeros. Represent the matrix as MatrixIdlePrec[i,j] where i is row index and j is the column index.
Initialize a 50*50 Matrix with zeros. Represent the matrix as MatrixIdleDuration[i,j] where i is row index and j is the column index.
Go over all trips for a vehicle for last three months.
Convert all driving duration to minutes and take the log with base 1.2. Denote the log by DrivingDuration. If value is more than 50 then round to 50.
Convert all idle duration to minutes and take the log with base 1.2. Denote this log by IdlingDuration. If value is more than 50 then round to 50.
Let IdlePer=IdlingDuration/(DrivingDuration+IdlingDuration).
Increment MatrixIdlePrec[IdlePerc, DrivingDuration] by one.
Increment MatrixIdleDuration[IdlePerc, DrivingDuration] by one.
Normalize MatrixIdlePrec and MatrixIdleDuration.

The final matrices may be used to represent a one or more 2-dimensional (Idling Duration and Driving Duration) vehicle operating usage patterns. In this embodiment, the 6 patterns shown in FIG. 9 and described in Table 1 represent 6 intermediate vocations or classes identified by this process for different vehicles are described in the description column of Table 6 and are shown in FIGS. 9a to 9f, respectively. Further, it should be understood that some vehicles may not have a recognizable recurring pattern and hence cannot be labelled. From FIG. 9a through 9f each pattern is representative of a corresponding predominant vehicle behavioral execution pattern and can be labelled.

TABLE 6

| FIG. | Intermediate Class (Multi Class-Vocation) | Feature | Description |
| --- | --- | --- | --- |
| 9a | NoIdle Long Drive | Idling Duration and Driving Duration | Long driving duration, almost no idling duration |
| 9b | MoreIdle Long Drive | Idling Duration and Driving Duration | Long driving duration, idle more than drive in a trip |
| 9c | MoreIdle Short Drive | Idling Duration and Driving Duration | Short driving duration, idle more than drive in a trip |
| 9d | NoIdle Short Drive | Idling Duration and Driving Duration | Short driving duration, almost no idling duration |
| 9e | MoreDrive Long Drive | Idling Duration and Driving Duration | Long driving duration, drive more than idle in a trip |
| 9f | MoreDrive Short Drive | Idling Duration and Driving Duration | Short driving duration, drive more than idle in a trip |

After having identified vehicles having the patterns descripted in Table 6, data may be extracted for vehicles having the determined corresponding predominant vehicle behavioral execution patterns and a label corresponding to the determined predominant vehicle behavioral execution pattern is assigned to this extracted vehicle data. Training data may then be generated from this labeled vehicle data. The training data may then be used with at least one machine learning technique to define a classifier for classifying vehicle vocation parameters based on an Idling Duration and Driving Duration feature independent of vehicle fleet groupings, industry vehicle application groupings and vehicle type groupings.

Telematics Vehicle Vocation Classification and Benchmarking

Referring to FIG. 2, an embodiment is described for a telematics vehicle vocation classifier and benchmarking system 122 for automatically classifying vehicle vocation and benchmarking vehicle performance attributes of a plurality of vehicles having a same vocation classification independent of vehicle fleet groupings, industry vehicle application groupings and vehicle type groupings.

The classifier and benchmarking system 122 in the embodiment of FIG. 2 is shown to communicate with data management system 120 which is configured to store recurring historical vehicle operational data received from monitors 104 for many or all vehicles 114 in the ecosystem. Further, in this embodiment, the data management system 120 may store a subset of vehicle data related to operating executions of the vehicle that may include data for all vehicles in one or more fleets and/or the ecosystem for the Applicant. This data may include GPS data, trips data, some vehicle labelling, and enrichment data. The GPS data is collected by Geotab's curved algorithm and the GPS data has the Latitude and Longitude locations where the vehicle has visited. The trips data has the timestamp when the trip begins, when the trip ends, the distance travelled during the trip, the amount of idling during the trip and the driving duration. For some of the vehicles, where the vocation of that vehicle is known, labelling of the vehicle data with the vocation may form part of the overall data. The trip data may further be enriched with the start and stop location of each trip. In an embodiment, this collected data may be communicated for each vehicle to the intermediate vehicle vocation classifiers 202, 204, 206, 208, 210 and 212. In an alternative embodiment, the data management system and the vehicle monitors 104 may form or considered to form part of the telematics vehicle vocation classifier and benchmarking system 122.

The intermediate vehicle vocation classifiers each have been trained by a machine learning technique as discussed hereinbefore to provide feature related classifiers shown in FIG. 2 as Geolocation trained classifier 202, Two Distance trained classifier 204, Routine trained classifier 206, Geo-Neighbourhood trained classifier 208, Stop Duration Trained classifier 210 and Idle Duration trained classifier 212. Each intermediate vehicle vocation classifier communicates with data management system 120 and is configured by a machine learning technique for analysing the recurring vehicle feature usage data for the vehicle to determine therefrom one or more predominant vehicle behavioral executions for the vehicle. The intermediate classifiers assign to each of the one or more predominant vehicle behavioral executions for the vehicle intermediate probability scores representing one or more intermediate predicted vocations or intermediate vocation features for the vehicle.

The system 122 further includes a refined prediction classifier 214 in communication with the one or more intermediate vehicle vocation classifiers for receiving the intermediate probability scores representing intermediate predicted vocations. The refined prediction classifier 214 further scores the intermediate probability scores to automatically derive a refined prediction of the one or more vocations of the vehicle. As shown in FIG. 2, the refined predictions of vocation are outputted at 220. Some predicted vocations outputted may be as follows:

Hub and Spoke (Quick Stops) which for example may be Pizza Delivery, Parts delivery, and On-demand delivery vehicles;

Patroller which for example may be Taxi, Police, and Uber vehicles;

Hub and Spoke (Long Stops) which for example may be On-site service and repair, Tool and equipment rentals, and On-demand service vehicles;

Daytime Tour (Long Stops) which for example may be Food and beverage delivery;

On-site service company, and Cable/phone/internet installer vehicles;

Door to Door which for example may be Couriers, and Door-to-door package delivery;

Night-time Tour (Long Stops) which for example may be Food and beverage delivery, Emergency service, ATM and cash service, Cable/phone/internet vehicles;

Long Distance (All Hours) which for example may Long haul, Freight and logistics service vehicles;

All Hours Tour (Long Stops) which for example may be Food and beverage delivery, Energy company vehicles;

Long Distance (Overnight) which for example may be Long haul, Freight and logistics service vehicles;

Local (All Hours) which may be for example Yard management, Mining, Airport, Construction vehicles;

Long Distance (Daytime) which may be for example Long haul, Freight and logistics service vehicles.

Local (Quick Stops) which may be for example Courier or Delivery vehicles.

Tour Based (Worker Vehicle) which may be for example Utility vehicles and Garbage trucks.

Local (School Transport) which may be for example School buses.

On-demand which may be for example Rental cars and Car share vehicles.

In the embodiments described there may be as many as about 32 intermediate vocation classes that from which the refined prediction classifier scores and obtains may be as many as about 15 final vocation classes. The use of the two-step classification from intermediate vocation classification to refined predicted vocation classification is a two step classification process because of the lack of labelled training data. The two-step process allows for classifications of smaller modules to be targeted with fewer training data. The refined prediction classifier 214 uses the outputs 222 of the intermediate vehicle vocation classifiers 202 through 212 as feature inputs to train a machine learning technique. The weighting of the refined prediction classifier 214 has been adjusted during training to make the vocation classification predictions. In an embodiment the machine learning technique is a random forest generator. In other embodiments the machine learning technique may apply the use of a neural network or CNN network.

The system 122 further includes benchmarking management systems 216 communicating with a vehicle refined vocation prediction 220 and the vehicle data management system 120 whereby each benchmarking management subsystem 216a stores or groups vehicle operation data of vehicles sharing the same predicted vocation 220. Each benchmarking management sub-system 216a also determines from the vocation grouped vehicle operational data one or more benchmarking vehicles having better performance characteristics than other vehicles of the same refined predicted vocation. Each benchmarking management sub-system 216a is configured to benchmark other refined predicted vocation vehicles relative to the benchmarked vehicles and communicate vehicle operation information of the benchmarked vehicles with fleet owners having the same refined predicted vocation vehicles. It should be further understood that the vehicle data compared in each sub-system 216a may also be sorted or group according to other characteristics of the vehicle in addition to a sorting or grouping by vocation.

Figure 10:
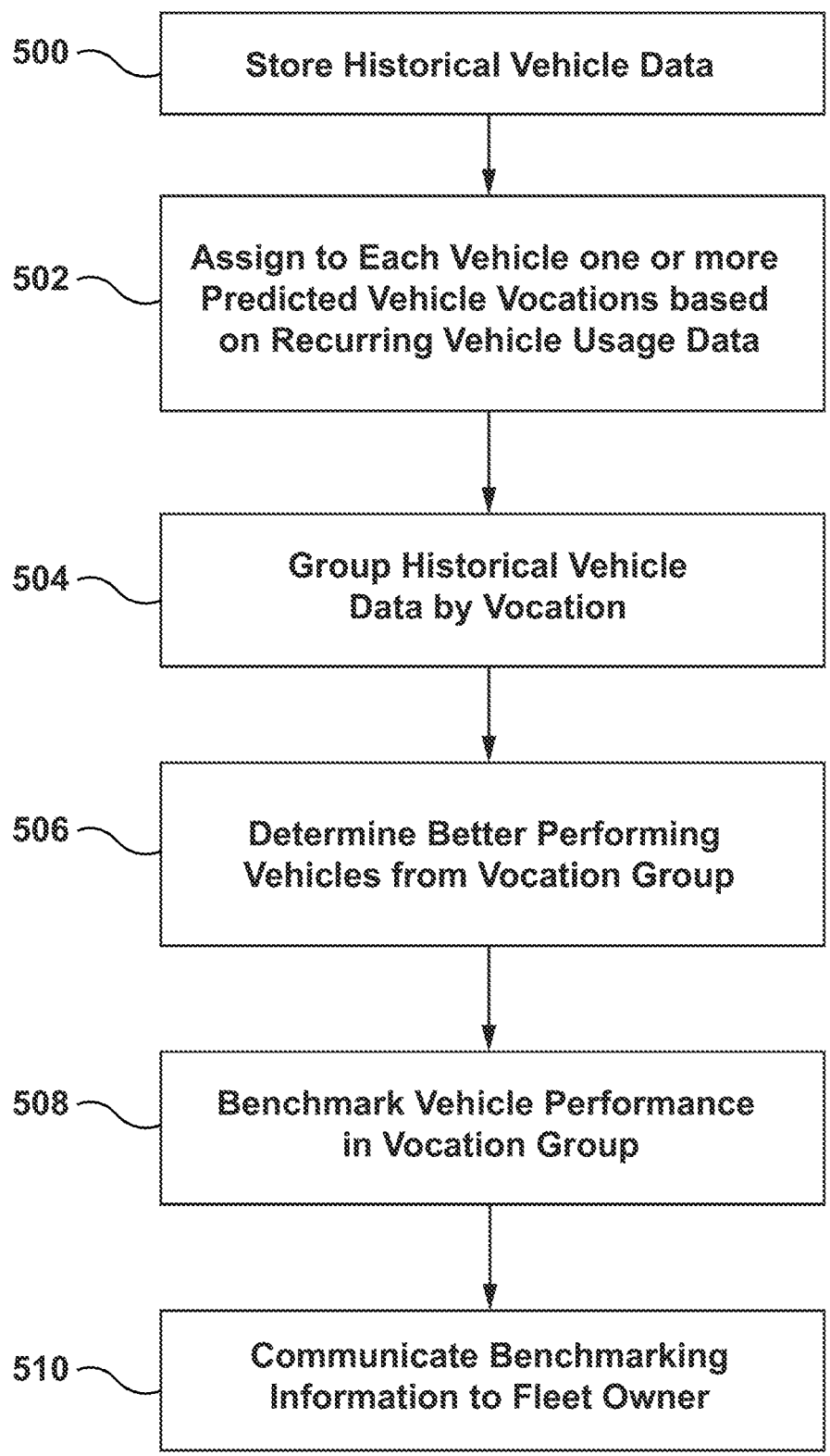

Referring to an exemplary flow chart FIG. 10, the operation of the classifier and benchmarking system 122 in the telematics system 100 is now described for automatically classifying vehicles by vocation in a manner that is independent of vehicle fleet groupings, industry vehicle application groupings and vehicle type groupings. Also described is the operation of benchmarking vehicles of same vocation relative to each other.

First historical vehicle data is stored at 500 for each vehicle of a plurality of vehicles. This historical vehicle data includes recurring vehicle usage data over a predetermined period of operation. In examples the period of operation may be between about 30 to 90 days and may be greater or shorter and is chosen to provide an adequate sampling of the days of operation of the vehicle that may result in a prediction of the vehicles vocation.

Next, one or more machine learning trained classifiers is/are utilized at step 502 to assign to each vehicle of the plurality of vehicles one or more predicted vocations based on the recurring vehicle usage data for each vehicle. In an alternative method it is envisaged by the inventors that the one or more machine learning trained classifiers analyse the recurring vehicle usage data for each vehicle to determine therefrom one or more predominant vehicle behavioral executions for each vehicle, and assign probability scores to each of the one or more predominant vehicle behavioral executions representing the one or more predicted vocations or vocation features for each vehicle.

At step 504 the historical vehicle data for vehicles of same determined predicted vocation are grouped together.

At step 506, better performing vehicles is determined from the historical data for each vocation grouping.

At step 508 vehicle benchmarking performance is performed by determining from the vocation grouped historical data one or more benchmarking vehicles having better performance characteristics than other vehicles of the same determined vocation grouping.

At sept 510 the information of one of the benchmarked vehicles, other vehicles and/or both is communicated to a fleet owner.

In an alternative method embodiment, the assigning step may first assign one or more intermediate predicted vocation features based on the recurring vehicle usage data for the each vehicle then may assign one or more vocations for the each vehicle based at least on the one or more intermediate predicted vocation features.

While the invention has been described in terms of specific embodiments, it is apparent that other forms could be adopted by one skilled in the art. For example, the methods described herein could be performed in a manner which differs from the embodiments described herein. The steps of each method could be performed using similar steps or steps producing the same result but which are not necessarily equivalent to the steps described herein. Some steps may also be performed in different order to obtain the same result. Similarly, the apparatuses and systems described herein could differ in appearance and construction from the embodiments described herein, the functions of each component of the apparatus could be performed by components of different construction but capable of a similar though not necessarily equivalent function, and appropriate materials could be substituted for those noted. Accordingly, it should be understood that the invention is not limited to the specific embodiments described herein. It should also be understood that the phraseology and terminology employed above are for the purpose of disclosing the illustrated embodiments, and do not necessarily serve as limitations to the scope of the invention.

Nomenclature

Classifier: a classification model defined by using a machine learning technique for classifying an object. In context of this application, a classifier classifies a vocation parameter, a feature, an intermediate vocation and a vocation for the vehicle.

Feature: data indicative of variables/attributes, or measurements of properties of a phenomenon being observed and/or data derived therefrom. In context of this application, a feature is an individual measurable property or characteristic of a phenomenon being observed.

Historical vehicle data: vehicle data collected over a period of time.

Monitoring device: a device onboard a vehicle for detecting environmental operating conditions and vehicle usage conditions associated with a vehicle and transmitting raw vehicle data indicative thereof.

Raw vehicle data: all data transmitted from a vehicle by a monitoring device which may include vehicle operation information indicative of vehicle operating conditions and the date and time vehicle operating conditions were logged, and may include information for identifying an onboard monitoring device and/or the vehicle the monitoring device is aboard.

Recurring vehicle usage data: data tracking the usage of a vehicle over time such as for example a predetermined number of days of vehicle operation.

Predominant Vehicle Behavioral Execution Pattern: A recurring behavioural execution pattern for the vehicle over a period of vehicle operation.

Training Data: data utilized to train the classifier and may comprise, feature data, raw vehicle data related to feature data, trip data, visualization data, graphical data, combinations thereof and other data apparent to a person skilled in the art.

Trip Data: vehicle usage data selected and/or derived from raw vehicle data over time that corresponds to vehicle executions or operations.

Vehicle: a transportation asset, some examples include: a car, truck, recreational vehicle, heavy equipment, tractor, and snowmobile.

Vehicle data: raw vehicle data and data derived therefrom including, for example, trip data.

Vehicle Operating Usage Pattern: Is a pattern a vehicle exhibits during operation that may be recognizable to a human.

Vehicle Usage Executions: Operating uses of the vehicle over time during different periods of operation and how the vehicle executes its operation during those periods of operation.

What is claimed is:

1. A telematics vehicle vocation classifier and benchmarking system for automatically classifying vehicle vocation and benchmarking vehicle performance attributes of a plurality of vehicles having a same vocation classification independent of vehicle fleet groupings, industry vehicle application groupings and vehicle type groupings, the system comprising:
   at least one vehicle vocation classifier communicating with a data management system that is configured to store historical vehicle data for each vehicle of the plurality of vehicles, the historical vehicle data including recurring vehicle usage data;
   wherein the at least one vehicle vocation classifier assigns one or more predicted vocations for said each vehicle based on the recurring vehicle usage data for said each vehicle by using a machine learning technique; and,
   a benchmarking management system communicating with the data management system and the at least one classifier configured to:
   group at least by vocation the historical vehicle data for vehicles of same determined predicted vocation and determine therefrom one or more benchmarking vehicles having better performance characteristics than other vehicles of the same determined predicted vocation; and,
   benchmark performance of the other predicted vocation vehicles relative to the one or more benchmarking vehicles.

2. The telematics vehicle vocation classifier and benchmarking system of claim 1 wherein the at least one vehicle vocation classifier comprises a plurality of intermediate vehicle vocation classifiers and at least one refined prediction classifier arranged in one of a series relation, a parallel relation and a combination of both, and configured for assigning the one or more predicted vocations, one or more intermediate predicted vocation features, and both.

3. The telematics vehicle vocation classifier and benchmarking system of claim 1 wherein the at least one vehicle vocation classifier first assigns one or more intermediate predicted vocation features based on the recurring vehicle usage data for said each vehicle and wherein at least another one of the vehicle vocation classifiers assigns one or more vocations for said each vehicle based at least on the one or more intermediate predicted vocation features.

4. The telematics vehicle vocation classifier and benchmarking system of claim 1 wherein the benchmarking management system is configured to communicate vehicle operation information of one of the benchmarked vehicles, other refined predicted vocation vehicles and both with a fleet owner.

5. The telematics vehicle vocation classifier and benchmarking system of claim 1 wherein the one or more vehicle classifiers comprises one or more intermediate classifiers with at least one intermediate classifier configured by the machine learning technique for receiving the recurring vehicle usage data for said each vehicle to determine therefrom one or more predominant vehicle behavioral executions for said each vehicle, and to assign to each of the one or more predominant vehicle behavioral executions intermediate probability scores representing one or more intermediate predicted vocation features for said each vehicle.

6. The telematics vehicle vocation classifier and benchmarking system of claim 5 further comprising at least one refined additional prediction classifier in communication with the at least one intermediate vehicle vocation classifier for receiving the intermediate probability scores representing intermediate predicted vocation features, and the at least one refined additional prediction classifier further scoring the intermediate vocation features to automatically determine the one or more predicted vocations for said each vehicle.

7. The telematics vehicle vocation classifier and benchmarking system of claim 1 further comprising a plurality of intermediate vehicle vocation classifiers each configured by a machine learning algorithm responsive to differing recurring vehicle feature usage data for the vehicle.

8. The telematics vehicle vocation classifier and benchmarking system of claim 1 wherein the benchmarking management system comprises a plurality of vocation benchmarking management systems, one for each vocation predicted by the refined prediction classifier.

9. The telematics vehicle vocation classifier and benchmarking system of claim 7, wherein the one or more intermediate vocation classifier provides one or more intermediate predicted vocations for the vehicle based on one or more features of geolocation, two distance, routine, geo-neighborhood, stop duration and customer location, and idling duration and driving duration.

10. The telematics vehicle vocation classifier and benchmarking system of claim 1 wherein the data management system forms part of the telematics vehicle vocation classifier and benchmarking system.

11. The telematics vehicle vocation classifier and benchmarking of claim 1 further comprising telematics monitoring devices for transmitting the raw vehicle data to the data management system.

* * * * *